US012319065B2

(12) United States Patent
Mizutani et al.

(10) Patent No.: US 12,319,065 B2
(45) Date of Patent: Jun. 3, 2025

(54) INK REFILL CONTAINER

(71) Applicant: SEIKO EPSON CORPORATION, Tokyo (JP)

(72) Inventors: Tadahiro Mizutani, Shiojiri (JP); Yoshihiro Koizumi, Shiojiri (JP); Taku Ishizawa, Matsumoto (JP); Shun Oya, Kiso-machi (JP); Tadashi Watanabe, Matsumoto (JP); Seigo Miyazawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 127 days.

(21) Appl. No.: 18/127,048

(22) Filed: Mar. 28, 2023

(65) Prior Publication Data

US 2023/0311522 A1 Oct. 5, 2023

(30) Foreign Application Priority Data

Mar. 29, 2022 (JP) ................................ 2022-053043
Dec. 26, 2022 (JP) ................................ 2022-207876

(51) Int. Cl.
*B41J 2/175* (2006.01)

(52) U.S. Cl.
CPC ........ *B41J 2/17506* (2013.01); *B41J 2/17596* (2013.01)

(58) Field of Classification Search
CPC .... B41J 2/175; B41J 2/17553; B41J 2/17596; B41J 29/02; B41J 2/1754; B41J 29/13; B41J 2/17566; B41J 2/17509; B41J 2/17523; B41J 2/17506; B41J 2002/17573
See application file for complete search history.

(56) References Cited

U.S. PATENT DOCUMENTS

| | | | | |
|---|---|---|---|---|
| 10,286,676 | B2 * | 5/2019 | Kimura ................ | B41J 2/17566 |
| 10,350,896 | B2 | 7/2019 | Ishizawa et al. | |
| 10,717,287 | B2 * | 7/2020 | Mizutani ............. | B41J 2/17523 |
| 11,117,379 | B2 * | 9/2021 | Fukasawa ............ | B41J 2/17509 |
| 11,192,380 | B2 * | 12/2021 | Ishizawa .............. | B41J 2/17523 |
| 2018/0250944 | A1 | 9/2018 | Ishizawa et al. | |
| 2021/0129552 | A1 | 5/2021 | Maruyama | |
| 2022/0016893 | A1 | 1/2022 | Nagai et al. | |

FOREIGN PATENT DOCUMENTS

| | | | |
|---|---|---|---|
| JP | 2012-851 | A | 1/2012 |
| JP | 2018-144281 | A | 9/2018 |
| JP | 2021-70256 | A | 5/2021 |
| JP | 2022-18712 | A | 1/2022 |

* cited by examiner

*Primary Examiner* — An H Do
(74) *Attorney, Agent, or Firm* — Oliff PLC

(57) ABSTRACT

An ink refill container for refilling a printer having an ink inlet flow-path member with ink includes: a container body portion configured to store ink; and an ink-outlet forming portion coupled to the container body portion and having a cylindrical portion forming an ink outlet. The ink-outlet forming portion includes a valve disposed in the cylindrical portion and configured to be opened by the ink inlet flow-path member inserted in the cylindrical portion, and closed by withdrawal of the ink inlet flow-path member from the cylindrical portion; a sealing member disposed at the ink outlet and configured to be in contact with the valve in a closed state of the valve; a holder member configured to hold at least one of the valve and the sealing member; and a fixing portion configured to fix the holder member to the cylindrical portion.

17 Claims, 16 Drawing Sheets

INK REFILL CONTAINER

The present application is based on, and claims priority from JP Application Serial Number 2022-207876 filed Dec. 26, 2022 and JP Application Serial Numbers 2022-053043, filed Mar. 29, 2022, the disclosures of which are hereby incorporated by reference herein in their entirety.

BACKGROUND

1. Technical Field

The present disclosure relates to an ink refill container.

2. Related Art

An ink jet printer is provided with an ink tank that stores ink, and ink is supplied to a print head from the ink tank. The ink tank of a printer has two types: cartridge type and ink refill type. In an ink tank of the cartridge type, when the amount of remaining ink decreases, the ink tank is replaced with a new ink tank. In an ink tank of the ink refill type, even when the amount of remaining ink decreases, the ink tank is used as it is, and ink is replenished from an ink refill container.

JP-A-2018-144281 discloses an ink refill container that stores an outlet valve unit inside a member forming an ink outlet, the outlet valve unit including a plurality of members constituting a spring valve, for example, an outlet sealing member and a spring member. JP-A-2022-018712 discloses an ink bottle (liquid storage container) that stores a plurality of members constituting a spring valve, for example, a seal rubber, a spring, a valve body and a holder inside a spout to form an ink outlet. JP-A-2012-000851 discloses an ink cartridge in which an ink outlet section from an ink chamber is provided with a valve housing chamber, and a valve unit including a valve body, a rod and a coil spring, and a sealing member are stored in the valve housing chamber.

Reuse of an ink refill container by refilling it with ink after use has been studied. In the ink refill container of JP-A-2018-144281, for reuse after use, it is required to replace an outlet sealing member and an outlet valve unit, remove and cleanse these, and refill with ink. However, JP-A-2018-144281 discloses nothing about whether the outlet sealing member and the outlet valve unit are configured to be removable, and how those are removed. In the ink bottle of JP-A-2022-018712, the outer diameter of the ink outlet is smaller than the outer diameter of the seal rubber, thus it is difficult to attach and detach the seal rubber through the ink outlet, and it is also difficult to attach and detach the valve body and the holder through the ink outlet. Furthermore, the nozzle is welded to the bottle, thus it is also difficult to remove the nozzle from the bottle, and remove the seal rubber and the holder. In the ink cartridge of JP-A-2012-000851, the sealing member is urged against the coil spring of the valve unit, thus when a cylindrical cap is detached, the sealing member may jump out by being pressed by the coil spring, and may be lost. Like this, an ink refill container in related art has room for improvement to facilitate removal of the members disposed inside an ink-outlet forming portion.

SUMMARY

According to an aspect of the present disclosure, there is provided an ink refill container for refilling a printer having an ink inlet flow-path member with ink. The ink refill container includes: a container body portion configured to store ink; and an ink-outlet forming portion coupled to the container body portion and having a cylindrical portion forming an ink outlet. The ink-outlet forming portion includes: a valve disposed in the cylindrical portion and configured to be opened by the ink inlet flow-path member inserted in the cylindrical portion and closed by withdrawal of the ink inlet flow-path member from the cylindrical portion; a sealing member disposed at the ink outlet and configured to be in contact with the valve in a closed state of the valve; a holder member configured to hold at least one of the valve and the sealing member; and a fixing portion configured to fix the holder member to the cylindrical portion.

DESCRIPTION OF EXEMPLARY EMBODIMENTS

A. First Embodiment

A1. Entire Configuration of Printer 100 and Ink Refill Container 200

Figure 1:
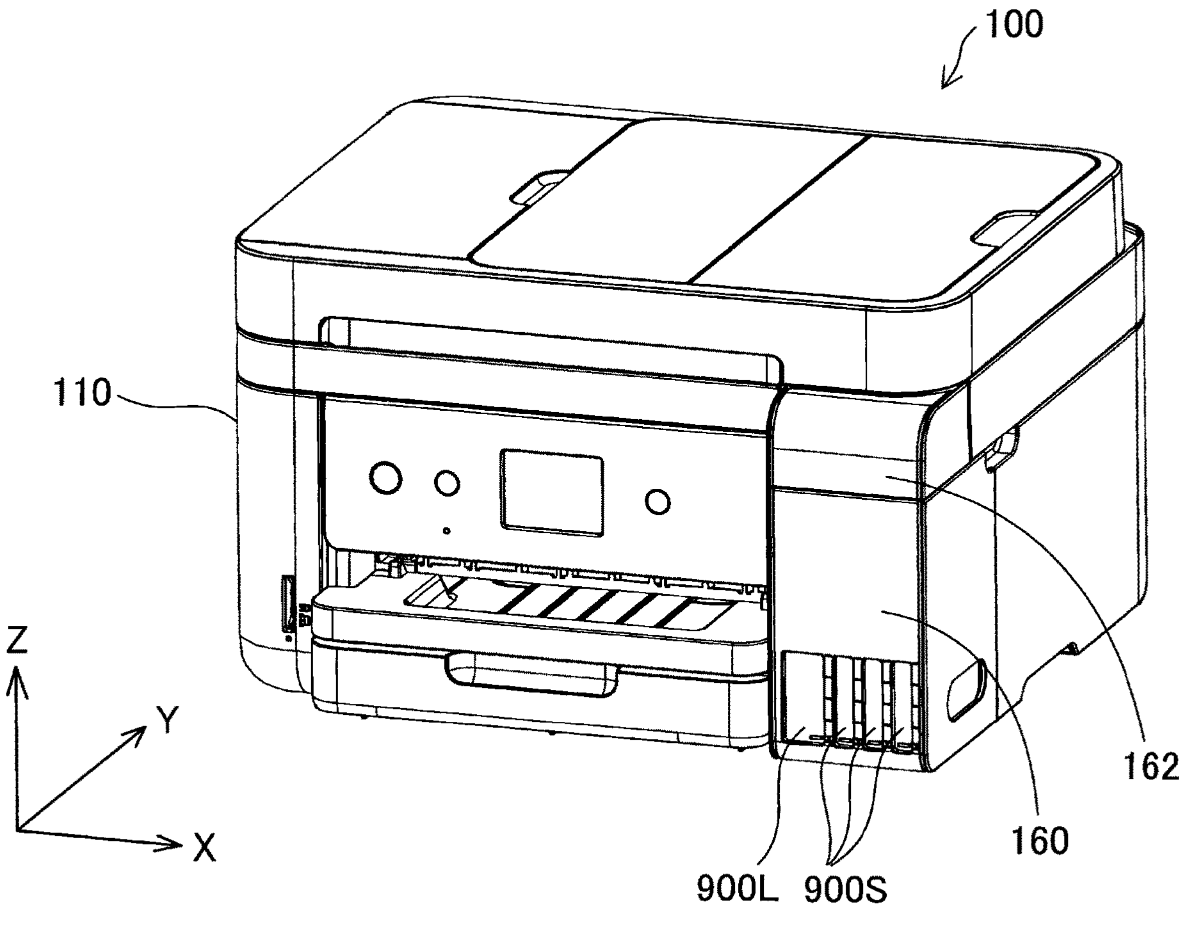
FIG. 1 is a perspective view of a printer in a first embodiment.

FIG. 1 is a perspective view of a printer 100 of a first embodiment. The printer 100 is an ink jet printer which performs printing by ejecting ink onto a print medium. FIG. 1 shows XYZ-axes which are orthogonal to one another. The X-axis corresponds to the width direction of the printer 100, the Y-axis corresponds to the depth direction of the printer 100, and the Z-axis corresponds to the height direction of the printer 100. The printer 100 is installed on a horizontal installation surface defined by the X-axis direction and the Y-axis direction. Note that "X-axis direction" is a concept that integrates +X direction and −X direction. Similarly, "Y-axis direction" is a concept that integrates +Y direction and −Y direction, and "Z-axis direction" is a concept that integrates +Z direction and −Z direction.

The printer 100 includes a housing 110. A carriage (not illustrated) movable in the main scanning direction (the X direction) is provided in the housing 110. The carriage is provided with a print head that ejects ink onto a print medium. One end of the front face of the housing 110 is provided with an ink-tank storing unit 160 that stores a plurality of ink tanks 900S, 900L. The ink-tank storing unit 160 has an openable and closable cover 162 at the top. Note that the ink tank 900S is a tank with a small capacity, and the ink tank 900L is a tank with a large capacity. However, in the following description, both tanks are simply referred to as the "ink tank 900" without distinguishing between them. Each ink tank 900 is connected to the print head of the carriage via a tube (not illustrated). In other words, the ink tank 900 is not mounted on the carriage of the printer 100 and is stationary. Also, each ink tank 900 is an ink refilled ink tank to which ink is replenished from an ink refill container when the amount of remaining ink decreases. Note that although the ink tank 900 is stationary in the present embodiment, the ink tank 900 may be mounted on the carriage of the printer 100.

Figure 2:
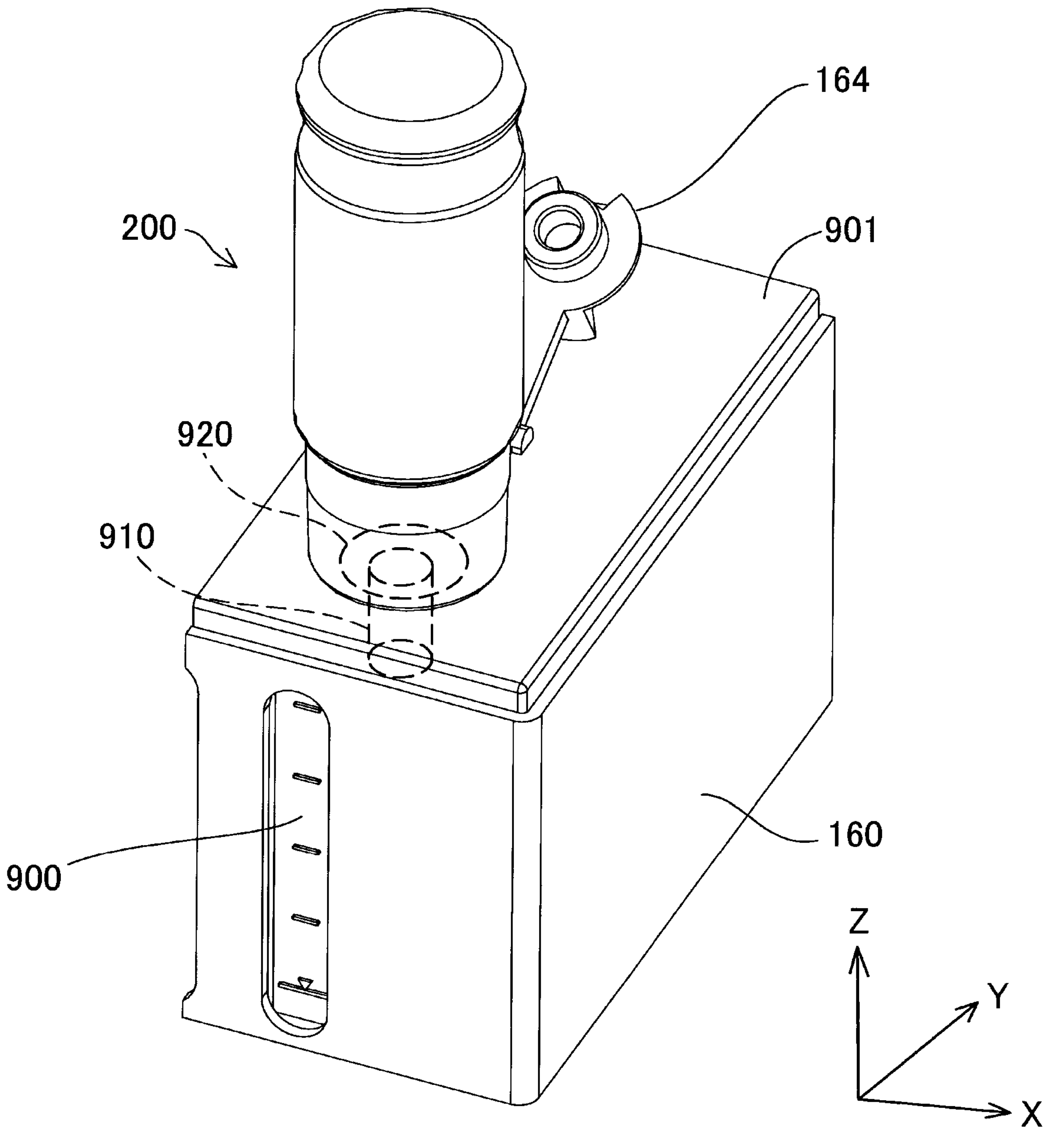
FIG. 2 is a perspective view illustrating a state in which an ink tank is refilled with ink using an ink refill container.

FIG. 2 is a perspective view illustrating a state (hereinafter referred to as an "ink refilling state") in which the ink tank 900 is refilled with ink using an ink refill container 200. Note that in FIG. 2, the later-described cap (cap 600) included in the ink refill container 200 is omitted for the sake of convenience of illustration. The front face of each ink tank 900 is composed of a transparent member, thus the amount of remaining ink of the ink tank 900 can be visually checked from the outside. When the amount of remaining ink decreases, a user can open the cover 162 to replenish ink through an ink inlet flow-path member 910 of the ink tank 900 as illustrated in FIG. 2. An end face 901 of the ink tank 900 in +Z direction is provided with an opening 920 indicated by a dashed line, and at normal times, the opening 920 is closed by a sealing cap 164. In contrast, when the ink tank 900 is refilled with ink, the sealing cap 164 is operated, and the above-mentioned opening 920 is exposed. The ink inlet flow-path member 910 has a thin tubular shape (needle shape) as the appearance shape, and is disposed along the Z-axis direction. When the sealing cap 164 is removed, the ink inlet flow-path member 910 is exposed through the opening 920. Subsequently, when the ink refill container 200 is set in the posture illustrated in FIG. 2, the end of the ink inlet flow-path member 910 in +Z direction is inserted into the inside of the ink refill container 200 through the later-described ink outlet (ink outlet 460). Thus, ink is replenished from the ink refill container 200 to the ink tank 900 through the ink inlet flow-path member 910.

In the present embodiment, the term "ink refilling" denotes an action of refilling the ink tank 900 with ink to increase the amount of remaining ink. However, "ink refilling" does not have to completely fill the ink tank 900 with ink. In addition, "ink refilling" includes an action of charging an empty ink tank 900 with ink for the initial use of the printer 100.

Figure 3:
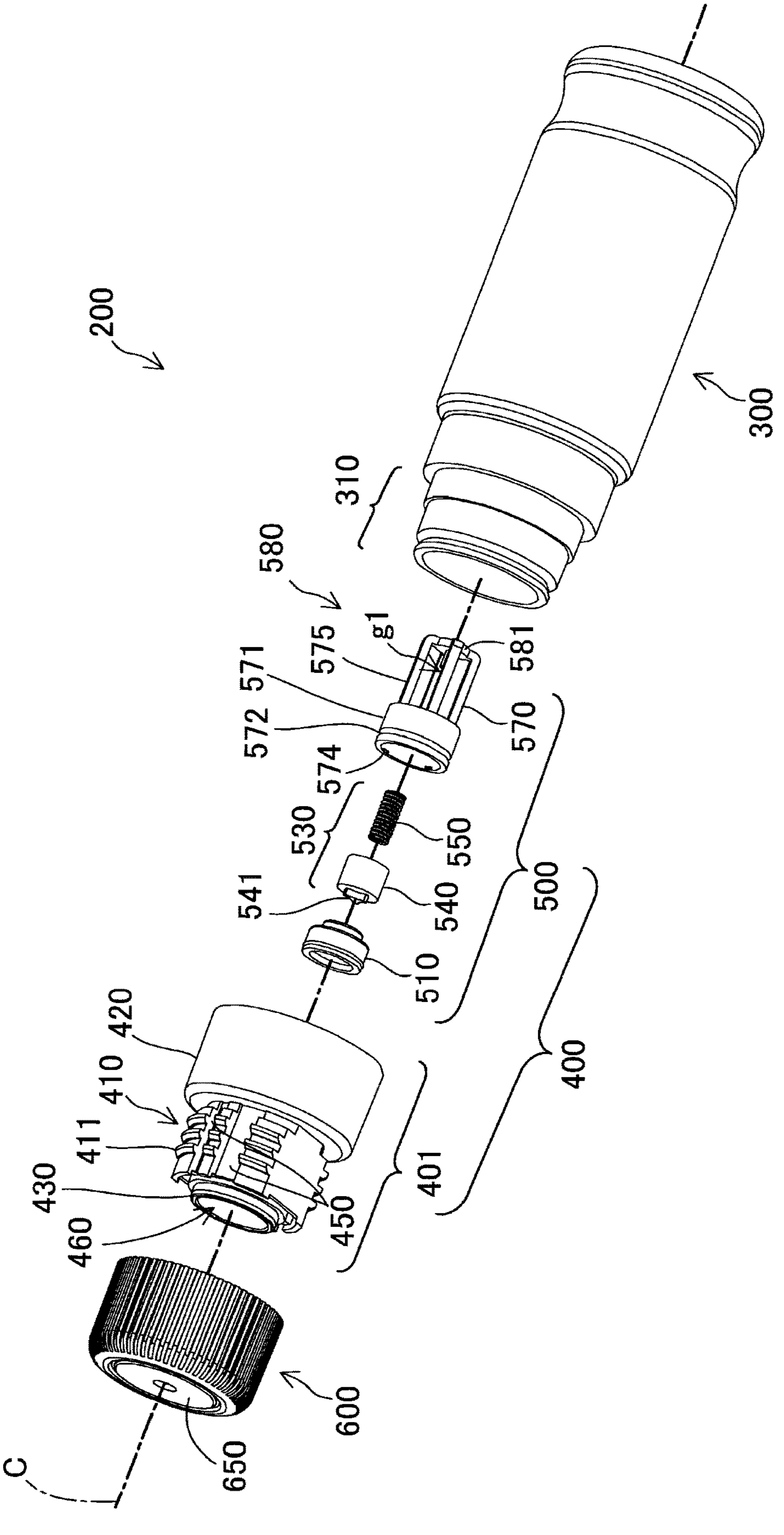
FIG. 3 is an exploded perspective view of the ink refill container.
Figure 4:
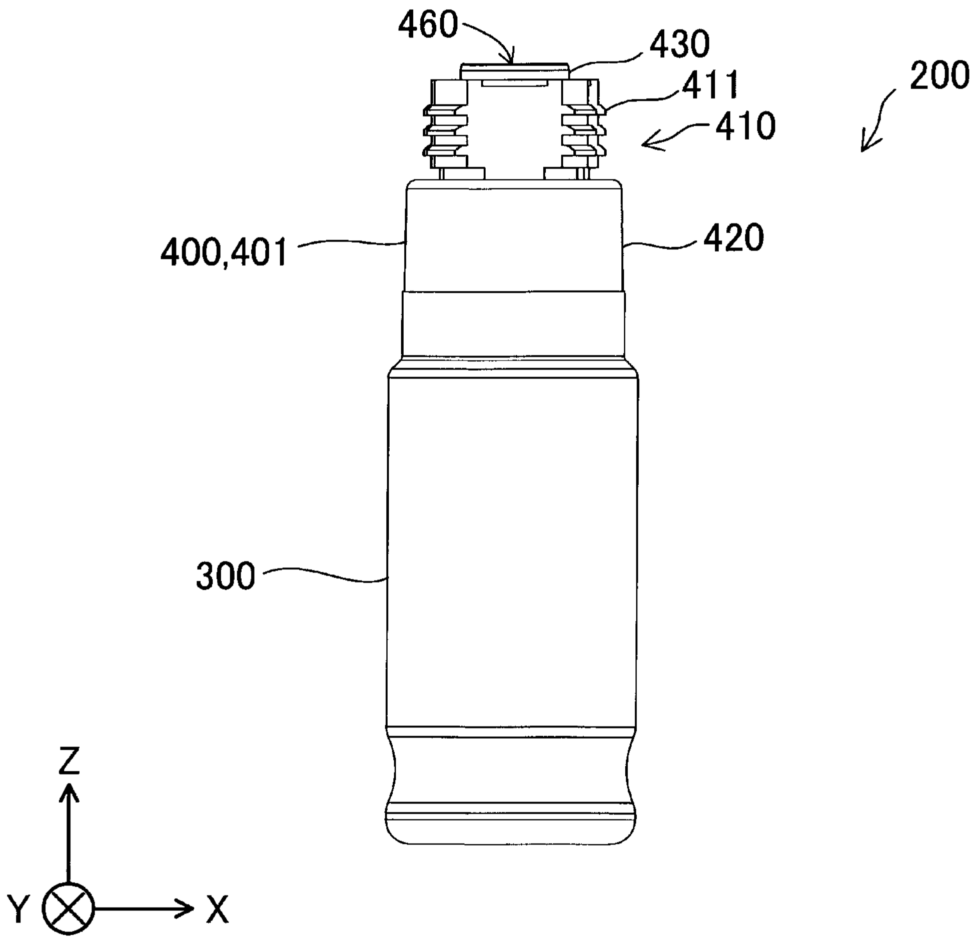
FIG. 4 is a side view of the ink refill container.
Figure 5:
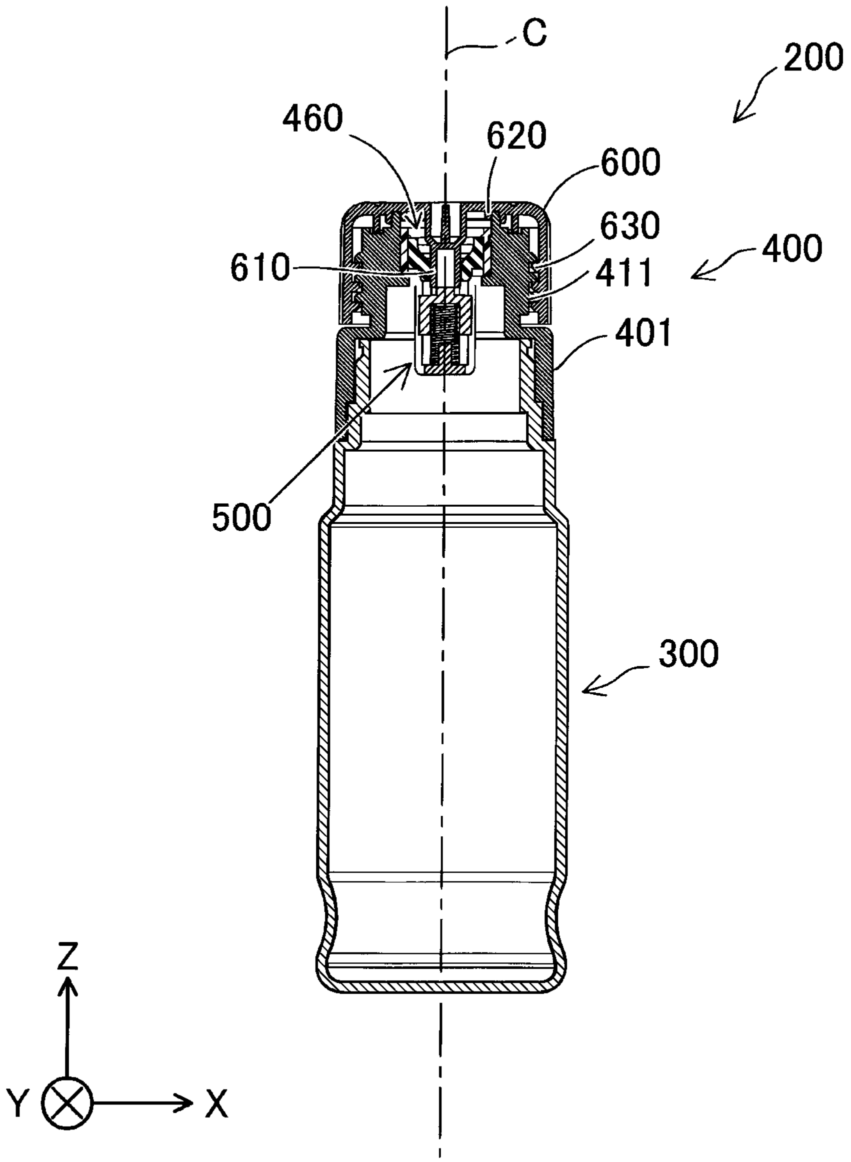
FIG. 5 is a cross-sectional view of the ink refill container.
Figure 6:
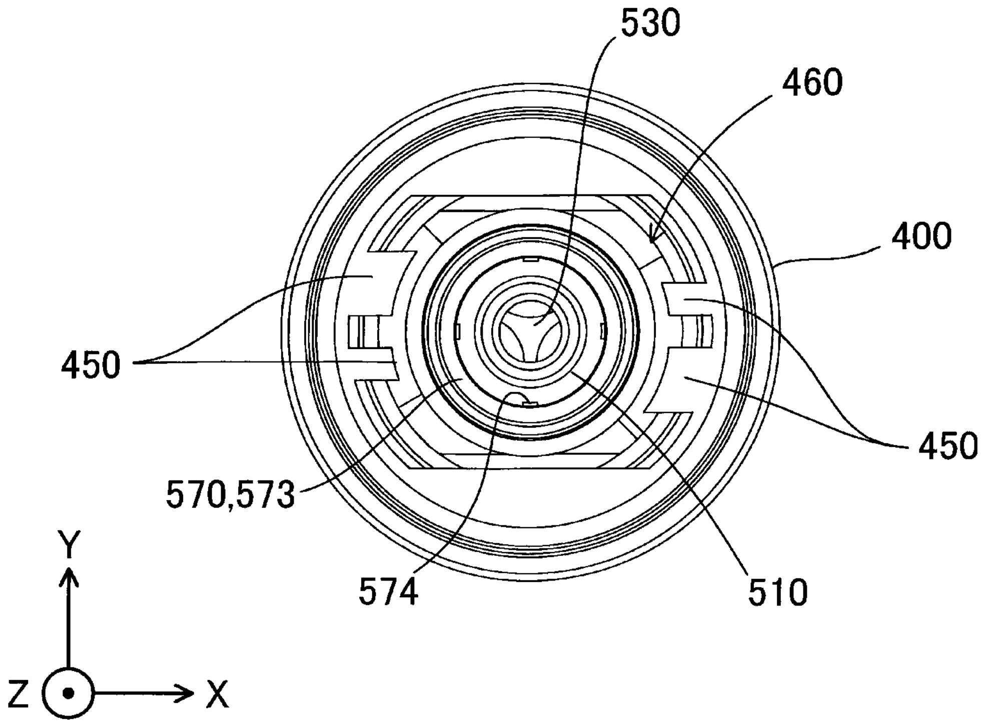
FIG. 6 is a top view of the ink refill container.

FIG. 3 is an exploded perspective view of the ink refill container 200. FIG. 4 is a side view of the ink refill container 200. FIG. 5 is a cross-sectional view of the ink refill container 200. FIG. 6 is a top plan view of the ink refill container 200. In FIGS. 4 and 6, of the ink refill container 200, the later-described cap 600 is omitted.

As illustrated in FIG. 3, the ink refill container 200 includes: a container body portion 300 configured to store ink; an ink-outlet forming portion 400 that forms an ink outlet 460; and a cap 600 attached to the ink-outlet forming portion 400. In the present embodiment, the upper-end side, which is the side close to the cap 600, of the ink refill container 200 is referred to as the "distal-end side", and the lower-end side, which is the side close to the container body portion 300, is referred to as the "proximal-end side". The container body portion 300 is a hollow cylindrical container having an opening on the distal-end side. A small diameter portion 310 at the distal end of the container body portion 300 is press-fitted into a large diameter portion 420 of the ink-outlet forming portion 400. In the present embodiment, the direction parallel to central axis C of the ink refill container 200 is referred to as the "axial direction", and a direction perpendicular to the axial direction is referred to as a "radial direction". Such a direction is parallel to the radius of the ink outlet 460 which is circular as viewed in the axial direction.

As illustrated in FIG. 3, the ink-outlet forming portion 400 includes a cylindrical portion 401, and an outlet valve unit 500. The cylindrical portion 401 has a tubular appearance shape, and forms the ink outlet 460 on the distal-end side. The cylindrical portion 401 includes the large diameter portion 420, a cylindrical portion distal end 430, and an engagement portion 410. The large diameter portion 420, the engagement portion 410, and the cylindrical portion distal end 430 are arranged and integrally formed in the axial direction in that order from the proximal-end side to the distal-end side.

The large diameter portion 420 has an approximately cylindrical appearance shape, and has an outer diameter larger than that of other parts in the ink-outlet forming portion 400. The large diameter portion 420 is positioned at the most proximal-end side of the ink-outlet forming portion 400, and is connected to the small diameter portion 310 of the container body portion 300 as described above.

The cylindrical portion distal end 430 is positioned at the most distal-end side of the ink-outlet forming portion 400. The cylindrical portion distal end 430 has a cylindrical appearance shape, and forms the ink outlet 460.

The engagement portion 410 is positioned between the large diameter portion 420 and the cylindrical portion distal end 430 in the axial direction. The engagement portion 410 has a cylindrical appearance shape, and includes a thread portion 411, and a matching groove portion 450 on the outer circumferential surface. As illustrated in FIG. 5, the thread portion 411 is screwed in a thread portion 630 provided on the inner circumferential surface of the cap 600. As illustrated in FIG. 3, the matching groove portion 450 is formed by a plurality of grooves extending in the axial direction. In the present embodiment, the matching groove portion 450 is formed by totally four grooves as illustrated in FIG. 6. These four grooves have a configuration in which two sets each having two grooves with different widths are arranged in a point symmetric manner around the central axis C. In each set of two grooves in the matching groove portion 450, the distance between the grooves and the width of each groove vary with the tank 900. In the ink tank 900, around the ink inlet flow-path member 910, four projections (not illustrated) arranged in a point symmetric manner with respect to a center at the central axis of the ink inlet flow-path member 910 are provided. The shapes of these four projections vary with ink tank, and are configured to be adapted to the matching groove portion 450 of the ink refill container 200 filled with compatible ink. Thus, when a proper compatible ink refill container 200 is attached to the ink tank 900 at the time of ink refilling, the four projections included in the ink tank 900 are inserted into the matching groove portion 450, thus the ink inlet flow-path member 910 is firmly inserted into the ink refill container 200. In contrast, when a wrong incompatible ink refill container 200 is attempted to be attached to the ink tank 900, the projections and the matching groove portion 450 are not adapted to each other, and the ink refill container 200 is not firmly attached to the ink tank 900. Thus, the ink tank 900 cannot be refilled with ink. In this manner, in the present embodiment, an incompatible ink refill container 200 is prevented from being attached to the ink tank 900 erroneously. In other words, the matching groove portion 450 is used to check to see if the ink refill container 200 is attached to an appropriate ink tank 900.

The outlet valve unit 500 is configured to seal the ink outlet 460 to avoid leakage of ink to the outside in a non-refilling state in which the ink tank 900 is not refilled with ink, and is configured to release the sealing so that ink flows into the ink inlet flow-path member 910 in a refilling state in which the ink tank 900 is refilled with ink. As illustrated in FIG. 5, the outlet valve unit 500 is disposed inside the cylindrical portion 401.

Figure 7:
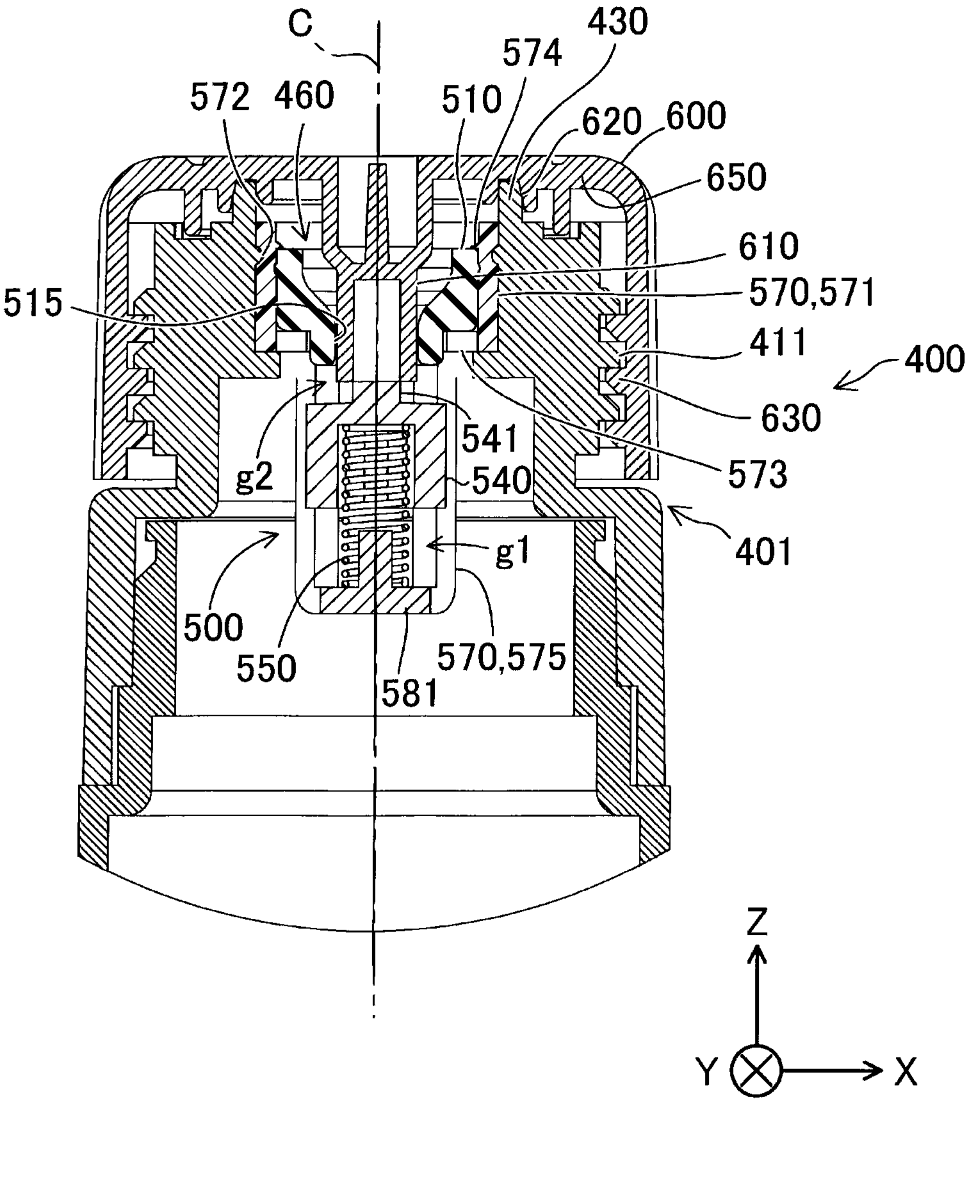
FIG. 7 is a cross-sectional view illustrating the detailed configurations of an ink-outlet forming portion.

FIG. 7 is a cross-sectional view illustrating the detailed configurations of the ink-outlet forming portion 400. FIG. 7 illustrates a cross section of part of the distal-end side of the ink refill container 200 in a state (hereinafter referred to as a "cap attached state") in which the cap 600 is attached, the cross section passing through the central axis C. As illustrated in FIGS. 3 and 7, the outlet valve unit 500 has a holder member 570, a spring valve 530, and a sealing member 510.

In the present embodiment, the holder member 570 holds the sealing member 510 and the spring valve 530. To "hold the sealing member 510 and the spring valve 530" means that the sealing member 510 and the spring valve 530 are integrated with the holder member 570, and restricted so as not to easily move to a position significantly away from the holder member 570. The holder member 570 is composed of resin, and includes a holder cylindrical portion 571, and a valve holding portion 580.

As illustrated in FIGS. 3 and 7, the holder cylindrical portion 571 has a cylindrical appearance shape. An annular groove 572 over the entire circumference is formed at a position close to the distal-end of the outer circumferential surface of the holder cylindrical portion 571. On the inner circumferential surface of the holder cylindrical portion 571, a plurality of stopper projections 574 are disposed apart from each other by a predetermined interval in the circumferential direction. The stopper projections 574 come into contact with the distal end (the later-described distal end 511) of the sealing member 510 to restrict withdrawal (release) of the sealing member 510 from the holder member 570.

The valve holding portion 580 holds the spring valve 530. The valve holding portion 580 includes a plurality of legs 575 and a bottom 581. The plurality of legs 575 are disposed along the axial direction. One end of each leg 575 is connected to the end face on the proximal-end side of the holder cylindrical portion 571, and the other end is connected to the outer edge of the bottom 581. The plurality of legs 575 are disposed apart from each other by a predetermined interval in the circumferential direction. Thus, as illustrated in FIG. 7, gap g1 is provided between adjacent legs 575. As illustrated in FIG. 7, the spring valve 530 (a valve body 540 and a spring member 550) is housed in the area surrounded by the plurality of legs 575 and the bottom 581.

As illustrated in FIG. 3, the spring valve 530 has a spring member 550 and a valve body 540. The spring member 550 is comprised of a coil spring. The spring member 550 is housed in the valve holding portion 580 so that the central axis thereof matches the central axis C. The end on the proximal-end side of the spring member 550 is fixed to the bottom 581, and the end on the distal-end side is in contact with the proximal-end side end face of the valve body 540. The spring member 550 urges the valve body 540 toward the ink outlet 460 (toward the distal-end side) in the axial direction. The valve body 540 has an approximately columnar appearance shape. The valve body 540 includes an approximately triangular flow path forming projection 541 in a plan view at the end on the distal-end side. The valve body 540 is configured to be slidable in the axial direction while being guided to the inner surface of the plurality of legs 575. In the cap attached state illustrated in FIG. 7, a cap projection 610 included in the cap 600 is inserted into the inside of the ink-outlet forming portion 400 through the ink outlet 460. In this situation, the distal end of the cap projection 610 is in contact with the distal end of the valve body 540, which is pressed by the cap projection 610 to the proximal-end side in the axial direction. At this point, when the valve body 540 is pressed with a force greater the urging force of the spring member 550, the spring member 550 compresses, and the valve body 540 is moved to the proximal-end side as illustrated in FIG. 7. As a result, as illustrated in FIG. 7, gap g2 is formed between the valve body 540 and the sealing member 510. Like this, a state, in which the valve body 540 is moved to the proximal-end side by an external pressing force and gap g2 is formed, is referred to as an "open valve state". In such an open valve state, the inside of the container body portion 300 and the outside of the ink outlet 460 communicate with each other.

Note that in the ink refilling state also, the outlet valve unit 500 performs the same operation as in the cap attached state illustrated in FIG. 7. Specifically, instead of the cap projection 610, the ink inlet flow-path member 910 is inserted in the ink-outlet forming portion 400 through the ink outlet 460, thus the valve body 540 is moved to the proximal-end side to form the gap g2. Therefore, the open valve state is achieved in this case, too. At this point, the ink in the container body portion 300 passes through the gap g1 formed in the valve holding portion 580, subsequently, the ink passes through the gap between the inner circumferential surface of the holder cylindrical portion 571 and the outer circumferential surface of the valve body 540, subsequently, the ink passes through the gap g2, subsequently, the ink passes through part of the end face of the ink inlet flow-path member 910, the part not overlapping with the flow path forming projection 541, then the gas flows into the inside of the ink inlet flow-path member 910.

The sealing member 510 has an approximately cylindrical appearance shape. The sealing member 510 is disposed at the ink outlet 460. The sealing member 510 is composed of a rubber member (elastomer) having rubber elasticity. The sealing member 510 has an opening 515 through which the ink inlet flow-path member 910 and the cap projection 610 are insertable and removable. As illustrated in FIG. 7, in the cap attached state, the cap projection 610 is inserted in the opening 515 of the sealing member 510. Similarly, in the ink refilling state, the ink inlet flow-path member 910 is inserted in the opening 515 of the sealing member 510. In contrast, in a state in which the cap projection 610 or the ink inlet flow-path member 910 is not inserted, the valve body 540 in the state illustrated in FIG. 7 is moved to the distal-end side by the urging force of the spring member 550. The flow path forming projection 541 is then inserted into the opening 515 of the sealing member 510, and the opening 515 is sealed by the surface (distal-end side end face of the valve body 540) around the flow path forming projection 541. At this point, the gap g2 disappears, and communicated state between the inside of the container body portion 300 and the outside of the ink outlet 460 is blocked. The state then is also referred to as the "closed valve state". The sealing member 510 is disposed in the holder cylindrical portion 571, and is held by the holder member 570. The details of holding of the sealing member 510 by the holder cylindrical portion 571 will be described later.

As illustrated in FIG. 7, the cap 600 has a cylindrical appearance shape having a bottom, and is attached to the ink-outlet forming portion 400 in the cap attached state. The cap 600 includes the above-described cap projection 610 at a covering portion 650 which corresponds to the bottom part. The covering portion 650 corresponds to the distal-end side end of the cap 600, and has a disk appearance shape perpendicular to the axial direction. The covering portion 650 covers the ink-outlet forming portion 400 in the axial direction. The cap projection 610 is disposed to extend in the axial direction from the center of the covering portion 650. As described above, in the cap attached state, the cap projection 610 is inserted into the ink-outlet forming portion 400 through the ink outlet 460. At this point, the end of the cap projection 610 reaches the valve body 540 through the opening 515 of the sealing member 510, and presses the valve body 540 toward the proximal-end side to achieve the state of FIG. 7. In the covering portion 650, around the cap projection 610, an annular groove 620 disposed to surround the cap projection 610 is formed. In the cap attached state, the distal end of the cylindrical portion distal end 430 is fitted to the annular groove 620, and the cylindrical portion distal end 430 comes into contact with the inner surface of the annular groove 620 to achieve tight sealing.

As illustrated in FIG. 7, the inner lateral surface of the cap 600 is provided with the thread portion 630, and in the cap attached state, the thread portion 630 is screwed in the thread portion 411 of the cylindrical portion 401. A user can remove the cap 600 from the ink-outlet forming portion 400 by turning the cap 600 to release the screwed connection between the thread portion 630 and the thread portion 411. Before the above-mentioned screwed connection is completely released, the cap projection 610 is withdrawn through the opening 515. At this point, the gap g2 remains to be formed. Thus, the inside of the container body portion 300 and the inside (the gap between the cap 600 and the ink-outlet forming portion 400) of the cap 600 communicate with each other through the gaps g1, g2 and the opening 515. In addition, the inside of the cap 600 communicates with the atmosphere (the outside of the ink refill container 200) through the gap formed between the cylindrical portion distal end 430 and the annular groove 620, and the gap at the screwed portion between the thread portion 630 and the thread portion 411. Thus, in the middle of removing the cap 600, the inside of the ink refill container 200 (the inside of the container body portion 300) is opened to the atmosphere. Therefore, when the internal pressure of the ink refill container 200 increases due to temperature change or atmospheric pressure change, the internal pressure is released in the middle of removing the cap 600, thus overflow of ink can be prevented. In addition, when the ink tank 900 is refilled with ink from the ink refill container 200 with an increased internal pressure, refilling the ink tank 900 with ink exceeding an upper limit thereof is likely to be avoided.

A2. Details of Holding and Fixing of Portions

Figure 8:
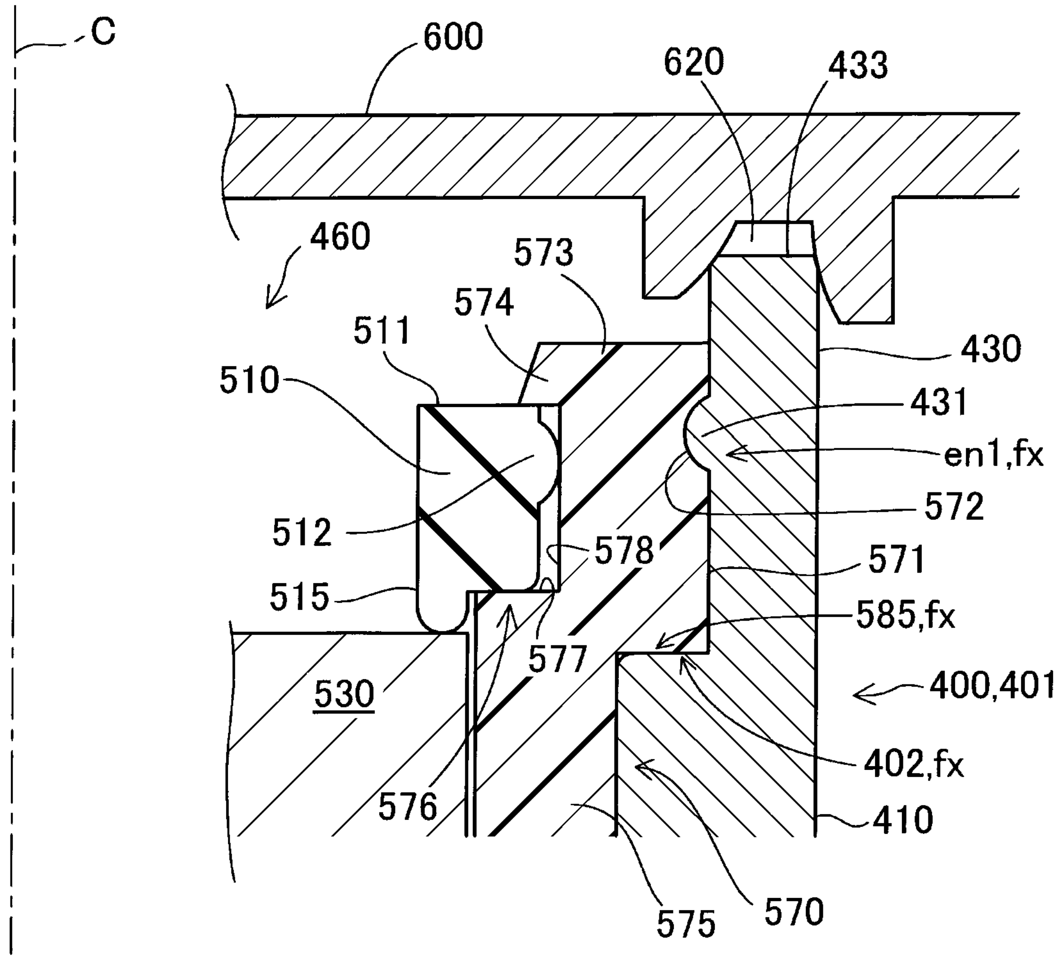
FIG. 8 is an enlarged cross-sectional view schematically illustrating the manner in which portions of the first embodiment are held and fixed.

FIG. 8 is an enlarged cross-sectional view schematically illustrating the manner in which portions of the first embodiment are held and fixed. FIG. 8 illustrates a cross section of part of the distal-end side of the sealing member 510, the holder member 570, and part of the distal-end side of the ink-outlet forming portion 400 along the axial direction in the closed valve state. In the sealing member 510, on the outer circumferential surface opposite to the inner circumferential surface in which the opening 515 is formed, an annular sealing member engagement portion 512 is formed, which projects outward in the radial direction.

In the holder member 570, a sealing member holding portion 576 is formed on the inner circumferential surface of the holder cylindrical portion 571. The sealing member holding portion 576 holds the sealing member 510. To "hold the sealing member 510" means to restrict movement of the sealing member 510 in the axial direction and the radial direction. The sealing member holding portion 576 includes a sealing member restricting portion 577, a second engagement portion 578, and the plurality of stopper projections 574. The sealing member restricting portion 577 restricts the movement of the sealing member 510 to the proximal-end side along the axial direction. The sealing member restricting portion 577 is configured as an annular plane extending in the radial direction, and is in contact with part of the proximal-end side end face of the sealing member 510. The second engagement portion 578 is perpendicular to the sealing member restricting portion 577, and is continuous to the distal-end side. The second engagement portion 578 is configured as part of the inner circumferential surface of the sealing member 510, and is engaged with the sealing member engagement portion 512 of the sealing member 510. The plurality of stopper projections 574 project from a holder distal end 573 of the holder member 570 inward in the radial direction (toward the center of the ink outlet 460). The proximal-end side end face of each stopper projection 574 is opposed to the sealing member restricting portion 577. The stopper projection 574 is in contact with a distal end 511 of the sealing member 510 to restrict the movement of the sealing member 510 toward the distal-end side. Here, "direction toward the distal-end side" matches the direction in which the ink inlet flow-path member 910 inserted in the ink-outlet forming portion 400 is withdrawn, and as described later, also matches the direction in which the outlet valve unit 500 is withdrawn from the ink-outlet forming portion 400. Thus, in the present embodiment, the direction toward the distal-end side along the axial direction is also referred to as the "withdrawal direction". Therefore, it can be said that the plurality of stopper projections 574 are in contact with the distal end 511 of the sealing member 510 to restrict the movement of the sealing member 510 in the withdrawal direction. Note that the direction opposite to the withdrawal direction along the axial direction is referred to as the "insertion direction".

On the inner circumferential surface of the ink-outlet forming portion 400 (the cylindrical portion 401), a step portion 402 is provided at the boundary between the cylindrical portion distal end 430 and the engagement portion 410. Here, in the holder member 570, the outer circumferential surface of the holder cylindrical portion 571 projects in the radial direction outward of the outer circumferential surface of the plurality of legs 575, and a step portion 585 is formed in the boundary section between the holder cylindrical portion 571 and the plurality of legs 575. As illustrated in FIG. 8, the step portion 585 of the holder member 570, and the step portion 402 of the ink-outlet forming portion 400 are engaged with each other in the axial direction. The holder member 570 is fixed, and positioned in the insertion direction by the step portions 585, 402.

As illustrated in FIG. 8, on the inner circumferential surface of the cylindrical portion distal end 430, an engagement projection 431 is formed, which projects inward in the radial direction over the entire circumference. The engagement projection 431 is inserted into the annular groove 572 provided in the outer circumferential surface of the holder cylindrical portion 571. Thus, the holder member 570 and the inner circumferential surface of the cylindrical portion 401 are engaged. In the present embodiment, the portion where the engagement projection 431 of the cylindrical portion distal end 430 (the cylindrical portion 401) is engaged with the annular groove 572 of the holder member 570 (the holder cylindrical portion 571) is also referred to as the "first engagement portion en1". The holder member 570 is fixed, and positioned in the insertion direction by the first engagement portion en1 in addition to by the engagement achieved by the above-mentioned two step portions 585, 402. In the present embodiment, the first engagement portion en1 and the two step portions 585, 402 are also referred to as the "fixing portion fx".

The distal-end section of the cylindrical portion distal end 430 is fitted to the annular groove 620, and the distal-end corner or the distal-end lateral portion is in contact with the annular groove 620. Here, when viewed in the insertion direction, the stopper projections 574 are positioned between the central axis C matching the center of the ink outlet 460, and a distal-end face 433 of the cylindrical portion 401 (the cylindrical portion distal end 430) in the radial direction. For this reason, as illustrated in FIG. 6, with the cap 600 removed, the stopper projections 574 are exposed when viewed in the insertion direction. Thus, a user can remove (withdraw) the holder member 570 through the ink outlet 460 to the outside by hooking a jig or the like on the stopper projections 574. At this point, the sealing member 510 and the spring valve 530 held by the holder member 570 can be removed along with the holder member 570.

With the ink refill container 200 of the first embodiment described above, when the holder member 570 is removed from the ink-outlet forming portion 400, the holder member 570 can be removed together with the spring valve 530 and the sealing member 510, thus removal work is made easy. In addition, as compared to when members are individually removed, occurrence of loss of members can be reduced. Because of these reasons, replacement of a member, cleansing of the ink refill container 200, and ink refilling are made easy.

In addition, when viewed in the insertion direction, the stopper projections 574 of the holder member 570 are exposed, thus the spring valve 530, the sealing member 510, and the holder member 570 (hereinafter referred to as the "holder member and the like") are easily removed through the ink outlet 460, for example, by hooking a jig or the like on the stopper projections 574. When the holder member and the like are removed, the spring valve 530 can be easily detached. In addition, the holder member and the like can be removed through the ink outlet 460 without releasing the connection between the ink-outlet forming portion 400 and the container body portion 300, thus removal work is made easy. In addition, since the holder member 570 is engaged with the cylindrical portion 401 (the cylindrical portion distal end 430) by the engagement portion (the annular groove 572 and the step portion 585) possessed by the holder member 570 itself, an additional fixing member is not necessary, and a simple structure can be implemented with reduced number of components.

Also, the holder member 570 and the spring valve 530 can be collectively removed by only removing the holder member 570. In addition, for attachment, with the spring valve 530 held by the holder member 570, both can be collectively attached through the ink outlet 460, thus attachment work is also made easy.

In addition, the holder member 570 includes the sealing member restricting portion 577, which restricts the movement of the sealing member 510 in the insertion direction, thus movement of the sealing member 510 toward the container body portion 300 in the insertion direction can be restricted by a force by which the ink inlet flow-path member 910 included in the printer 100 is inserted through the ink outlet 460.

B. Second Embodiment

Figure 9:
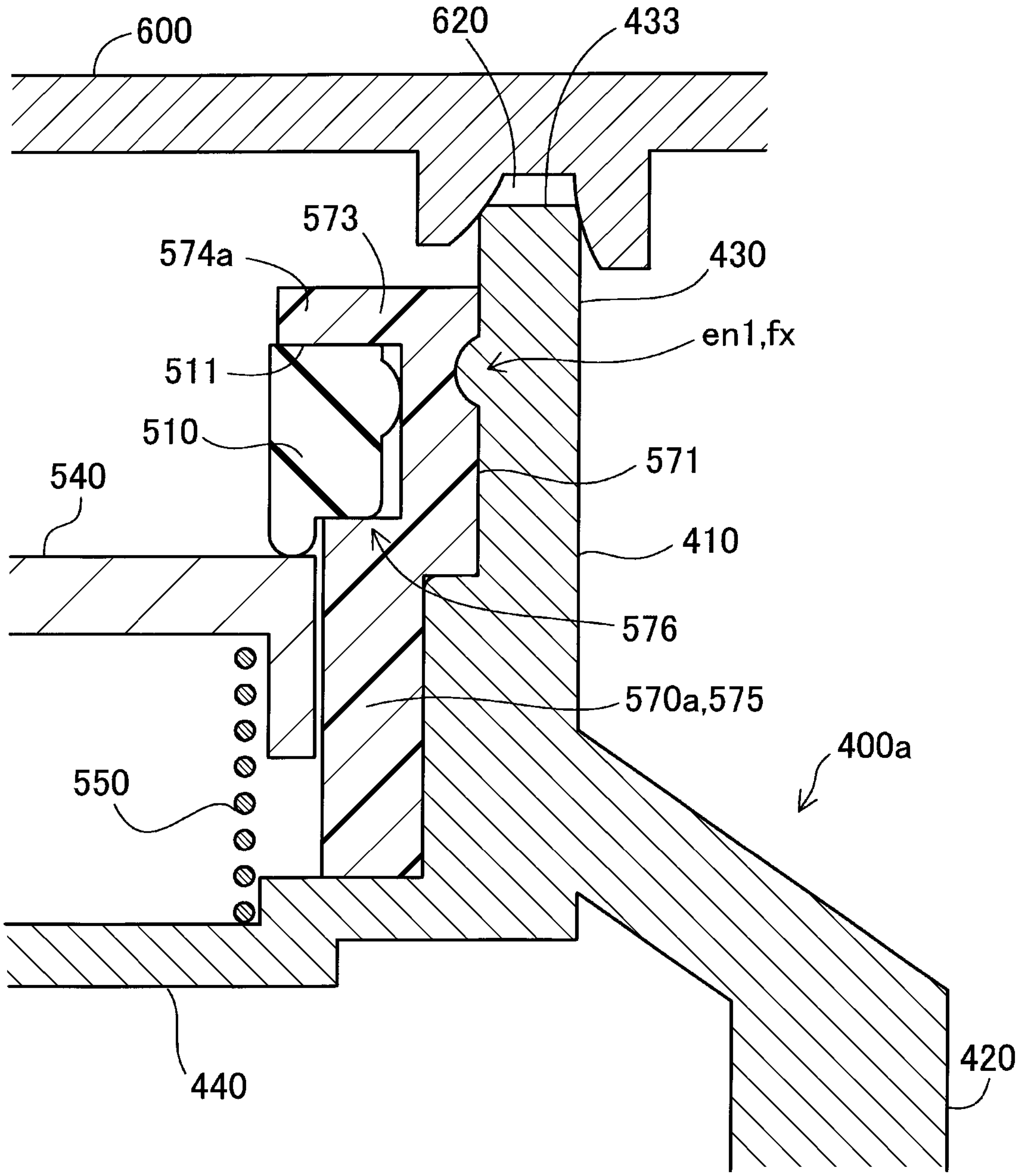
FIG. 9 is an enlarged cross-sectional view schematically illustrating the manner in which portions of an ink refill container of a second embodiment are held and fixed.

FIG. 9 is an enlarged cross-sectional view schematically illustrating the manner in which portions of an ink refill container 200 of a second embodiment are held and fixed. FIG. 9 illustrates a cross section of the same area as illustrated in FIG. 8.

The ink refill container 200 of the second embodiment differs from the ink refill container 200 of the first embodiment in that a holder member 570*a* is included instead of the holder member 570, and an ink-outlet forming portion 400*a* is included instead of the ink-outlet forming portion 400. Other components of the ink refill container 200 of the second embodiment are the same as those of the ink refill container 200 of the first embodiment, thus the same components are labeled with the same symbol, and a detailed description thereof is omitted.

The holder member 570*a* differs from the holder member 570 of the first embodiment in that stopper projections 574*a* are included instead of the stopper projections 574, and the bottom 581 is not provided. When viewed in the insertion direction, the stopper projections 574*a* overlap with the entirety of the distal end 511 of the sealing member 510 in the radial direction. As in the first embodiment, the sealing member 510 is held by the sealing member holding portion 576, and as mentioned above, the stopper projections 574*a* overlap with the entirety of the distal end 511 of the sealing member 510, thus withdrawal (release) of the sealing member 510 is more tightly restricted.

The ink-outlet forming portion 400*a* differs from the ink-outlet forming portion 400 of the first embodiment in that the ink-outlet forming portion 400*a* includes a valve support portion 440. The valve support portion 440 has an approximately disk appearance shape, and is disposed parallel to the radial direction at the boundary section between the engagement portion 410 and the large diameter portion 420 on the inner circumferential surface of the ink-outlet forming portion 400*a*. The outer circumferential edge of the valve support portion 440 is continuous to the inner circumferential surface of the large diameter portion 420 and the engagement portion 410. As illustrated in FIG. 9, the valve support portion 440 supports the proximal-end side end of the spring member 550, and the proximal-end side end of the holder member 570*a* (specifically, the proximal-end side end of the plurality of legs 575). Therefore, in the second embodiment, the spring valve 530 is held by the valve support portion 440 and not by the holder member 570*a*, thus movement of the spring valve 530 in the insertion direction is restricted. Also, movement of the holder member 570*a* in the insertion direction is also restricted by the valve support portion 440 in addition to the first engagement portion en1.

In the second embodiment, the process of assembling the ink refill container 200 includes a process in which the spring valve 530 is disposed in the valve support portion 440, and subsequently, an assembly member in which the sealing member 510 and the holder member 570*a* are assembled is press-fitted to the ink-outlet forming portion 400*a* so as to be positioned outward of the spring valve 530 in the radial direction. In contrast, the process of withdrawing the sealing member 510 and the spring valve 530 includes a process in which the above-mentioned assembly member is taken out by hooking a jig or the like on the stopper projections 574*a*, and subsequently, the spring valve 530 is taken out. The holder member 570*a* and the sealing member 510 can be collectively removed also in this process, thus as in the ink refill container 200 of the first embodiment, removal work is easy.

The ink refill container 200 of the second embodiment described above provides the same effect as that of the ink refill container 200 of the first embodiment. In addition, when viewed in the insertion direction, the stopper projections 574*a* overlap with the entirety of the distal end 511 of the sealing member 510 in the radial direction, thus withdrawal (release) of the sealing member 510 can be more tightly restricted. In addition, when the holder member 570*a* is removed, the sealing member 510 is unlikely to be detached from the holder member 570*a*, thus the holder member 570*a* and the sealing member 510 are likely to be collectively removed favorably.

C. Third Embodiment

Figure 10:
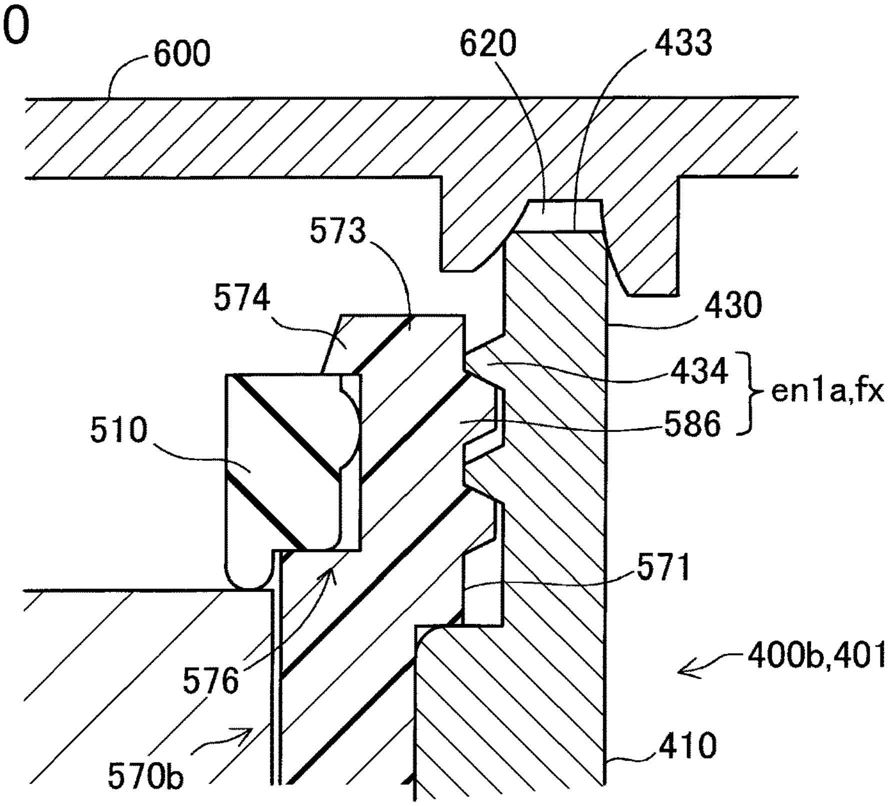
FIG. 10 is an enlarged cross-sectional view schematically illustrating the manner in which portions of an ink refill container of a third embodiment are held and fixed.

FIG. 10 is an enlarged cross-sectional view schematically illustrating the manner in which portions of an ink refill container 200 of a third embodiment are held and fixed. FIG. 10 illustrates a cross section of the same area as illustrated in FIG. 8.

The ink refill container 200 of the third embodiment differs from the ink refill container 200 of the first embodiment in that a holder member 570*b* is included instead of the holder member 570, and an ink-outlet forming portion 400*b* is included instead of the ink-outlet forming portion 400. Other components of the ink refill container 200 of the third embodiment are the same as those of the ink refill container 200 of the first embodiment, thus the same components are labeled with the same symbol, and a detailed description thereof is omitted.

The holder member 570*b* differs from the holder member 570 of the first embodiment in that the holder member 570*b* includes a thread portion 586 instead of the annular groove 572. The thread portion 586 is provided on the outer circumferential surface of the holder cylindrical portion 571.

The ink-outlet forming portion 400*b* differs from the ink-outlet forming portion 400 of the first embodiment in that a thread portion 434 is included instead of the engagement projection 431. The thread portion 434 is formed on the inner circumferential surface of the cylindrical portion distal end 430. The thread portion 586 of the holder member 570*b*, and the thread portion 434 of the ink-outlet forming portion 400*b* are screwed to each other to form a first engagement portion en1*a*. In other words, the first engagement portion en1*a* of the second embodiment is configured as a thread engagement portion.

The ink refill container 200 of the third embodiment described above provides the same effect as that of the ink refill container 200 of the first embodiment. In addition, since the first engagement portion en1*a* is configured as a thread engagement portion, providing an engagement portion such as a recess in the distal-end face of the holder member 570*b* allows the holder member 570*b* to be turned by engaging a jig such as a flathead screwdriver with the engagement portion when the holder member 570*b* is withdrawn, thus the holder member 570*b* is easily withdrawn through the ink outlet 460. Similarly, attachment of the holder member 570*b* is easy.

D. Fourth Embodiment

Figure 11:
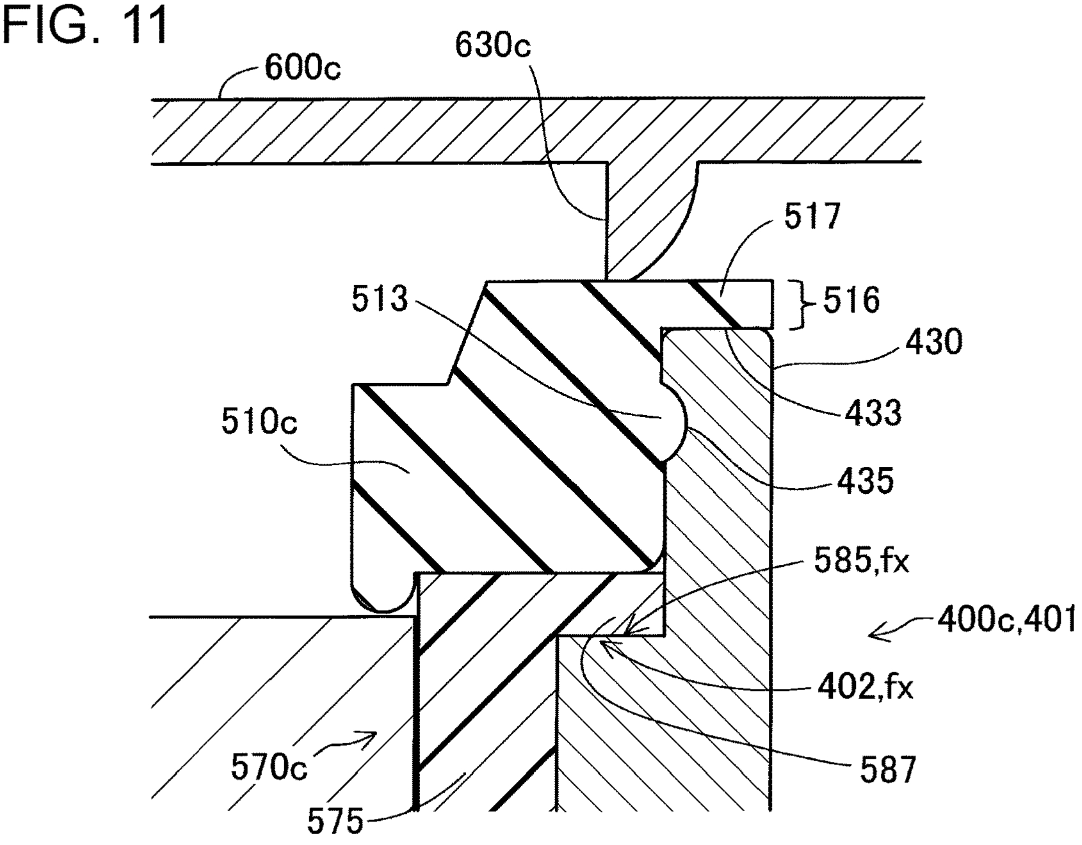
FIG. 11 is an enlarged cross-sectional view schematically illustrating the manner in which portions of an ink refill container of a fourth embodiment are held and fixed.

FIG. 11 is an enlarged cross-sectional view schematically illustrating the manner in which portions of an ink refill container 200 of a fourth embodiment are held and fixed. FIG. 11 illustrates a cross section of the same area as illustrated in FIG. 8.

The ink refill container 200 of the fourth embodiment differs from the ink refill container 200 of the first embodiment in that a holder member 570*c* is included instead of the holder member 570, an ink-outlet forming portion 400*c* is included instead of the ink-outlet forming portion 400, a sealing member 510*c* is included instead of the sealing member 510, and a cap 600*c* is included instead of the cap 600. Other components of the ink refill container 200 of the fourth embodiment are the same as those of the ink refill container 200 of the first embodiment, thus the same components are labeled with the same symbol, and a detailed description thereof is omitted.

The holder member 570*c* differs from the holder member 570 of the first embodiment in that a flange 587 is included instead of the holder cylindrical portion 571. The flange 587 has an annular thin plate appearance shape, and is continuous to the distal-end side end of the plurality of legs 575. The distal-end side end face of the flange 587 is in contact with the sealing member 510*c*. Thus, the flange 587 (the holder member 570*c*) restricts the movement of the sealing member 510*c* in the insertion direction. Note that the holder member 570*c* includes the plurality of legs 575 and the bottom 581, thus holds the spring valve 530 as with the holder member 570 of the first embodiment. In an outward area of the flange 587 in the radial direction, the above-mentioned step portion 585 is formed, and engaged with the step portion 402 of the ink-outlet forming portion 400*c*.

The ink-outlet forming portion 400*c* differs from the ink-outlet forming portion 400 of the first embodiment in that an annular groove 435 is formed instead of the engagement projection 431 in the cylindrical portion distal end 430. The annular groove 435 is comprised of a groove in an annular shape, which is formed in the inner circumferential surface of the cylindrical portion distal end 430.

The sealing member 510*c* differs from the sealing member 510 of the first embodiment in that a sealing member distal end 516 and a third engagement portion 513 are included. The sealing member distal end 516 is positioned at the most distal-end side of the sealing member 510*c*, and projects more than the cylindrical portion distal end 430 in the withdrawal direction. The sealing member distal end 516 includes a projection 517. The projection 517 extends radially outward of the cylindrical portion 401 (the cylindrical portion distal end 430) in the sealing member distal end 516, and overlaps with the distal end of the cylindrical portion 401, that is, the cylindrical portion distal end 430 in the withdrawal direction. As with the sealing member engagement portion 512, the third engagement portion 513 is configured on the outer circumferential surface of the sealing member 510*c* as an annular projection which projects outward in the radial direction. The third engagement portion 513 is engaged with the annular groove 435 of the cylindrical portion 401 (the cylindrical portion distal end 430). In other words, the third engagement portion 513 is engaged with the inner circumferential surface of the cylindrical portion 401 at a position closer to the distal end of the cylindrical portion 401 than the holder member 570*c* in the withdrawal direction.

The cap 600*c* differs from the cap 600 of the first embodiment in that the cap 600*c* includes a cap sealing portion 630*c*. The cap sealing portion 630*c* has an annular claw appearance shape extending in the insertion direction inward of the covering portion 650 in the cap 600*c*. In the cap attached state, the cap sealing portion 630*c* is in contact with the distal end of the sealing member 510*c*, that is, the sealing member distal end 516 to achieve sealing.

The ink refill container 200 of the fourth embodiment described above provides the same effect as that of the ink refill container 200 of the first embodiment. In addition, since the sealing member 510*c* also serves as a fixing portion that fixes the holder member 570*c* to the cylindrical portion 401, an additional member is not necessary for a fixing portion, and increase in the number of components can be prevented, and the structure can be made simple. Since the holder member 570*c* holds the spring valve 530, the holder member 570*c* and the spring valve 530 can be collectively removed by removing the sealing member 510*c* through the ink outlet 460, thus withdrawal work is made easy.

In addition, the projection 517 of the sealing member 510*c* is disposed outward (close to the cap 600*c*) of the cylindrical portion 401, thus the sealing member 510*c* is easily removed by gripping the projection 517.

In addition, in the cap attached state in which the cap 600*c* is attached, the cap sealing portion 630*c* is in contact with the distal end (the sealing member distal end 516) of the sealing member 510*c*, thus the possibility of detachment of the sealing member 510*c* is reduced at the time of distribution or at the time of storage of the ink refill container 200, thus withdrawal (release) of the spring valve 530 or ink leakage can be prevented.

E. Fifth Embodiment

Figure 12:
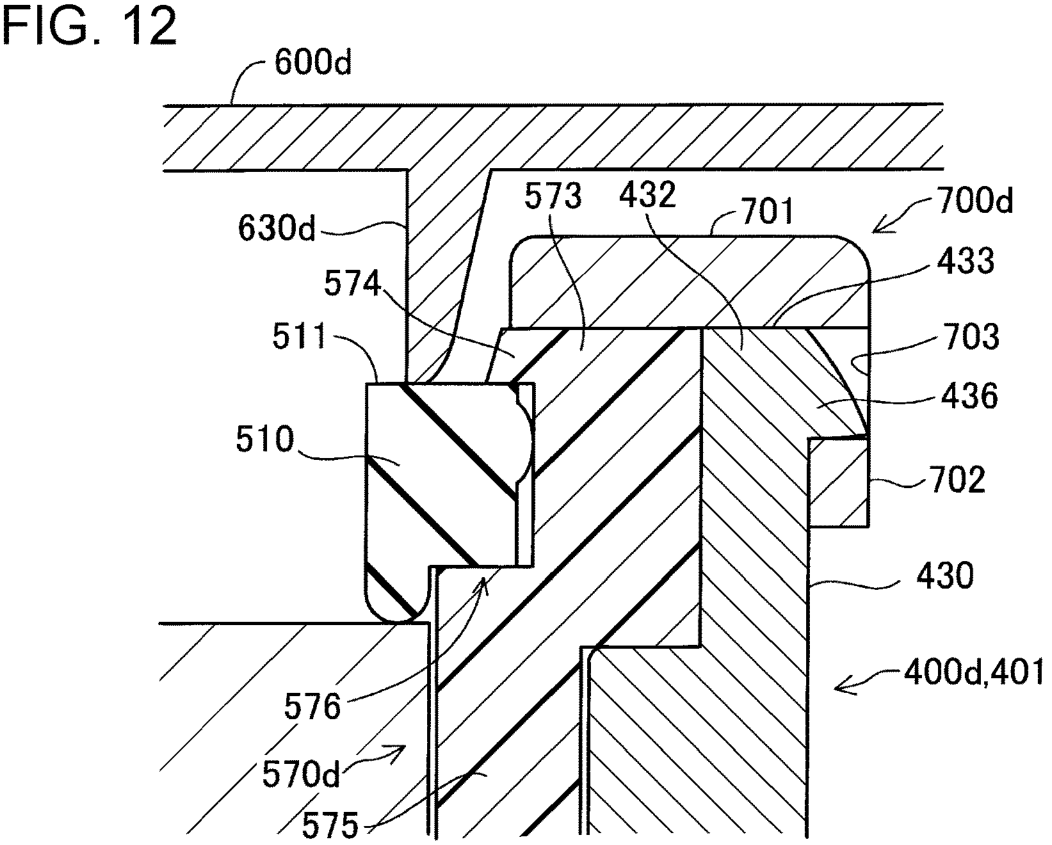
FIG. 12 is an enlarged cross-sectional view schematically illustrating the manner in which portions of an ink refill container of a fifth embodiment are held and fixed.

FIG. 12 is an enlarged cross-sectional view schematically illustrating the manner in which portions of an ink refill container 200 of a fifth embodiment are held and fixed. FIG. 12 illustrates a cross section of the same area as illustrated in FIG. 8.

The ink refill container 200 of the fifth embodiment differs from the ink refill container 200 of the first embodiment in that a holder member 570*d* is included instead of the holder member 570, an ink-outlet forming portion 400*d* is included instead of the ink-outlet forming portion 400, a cap 600*d* is included instead of the cap 600, and a cover cap 700*d* is additionally included. Other components of the ink refill container 200 of the fifth embodiment are the same as those of the ink refill container 200 of the first embodiment, thus the same components are labeled with the same symbol, and a detailed description thereof is omitted.

The holder member 570*d* differs from the holder member 570 of the first embodiment in that the annular groove 572 is not provided; however, other components are the same.

The ink-outlet forming portion 400*d* differs from the ink-outlet forming portion 400 of the first embodiment in that the engagement projection 431 is not provided, and a plurality of hooks 436 are formed at a distal end 432 of the cylindrical portion distal end 430. Each hook 436 has a claw appearance shape projecting outward from the distal end 432 in the radial direction. The plurality of hooks 436 are disposed apart from each other by a predetermined interval in the circumferential direction. In the fifth embodiment, the distal-end face of the holder member 570*c*, that is, the holder distal end 573 and the distal-end face of the stopper projections 574, and the distal-end face of the cylindrical portion 401, that is, the distal-end face of the distal end 432 have the same position in the axial direction, and form a single plane together.

The cap 600*d* differs from the cap 600 of the first embodiment in that the cap 600*d* includes a cap sealing portion 630*d*. The cap sealing portion 630*d* has the same configuration as that of the cap sealing portion 630*c* of the fourth embodiment described above except that the cap sealing portion 630*d* has a longer axial length. Therefore, the distal end (the distal end in the insertion direction) of the cap sealing portion 630*d* is in contact with the distal end 511 of the sealing member 510.

The cover cap 700*d* covers the holder distal end 573 and the cylindrical portion distal end 430 (the distal end 432) from the outside, and is engaged with the outer circumferential surface of the cylindrical portion 401. The cover cap 700*d* includes an annular lid 701, and an annular side wall 702 disposed to extend in the insertion direction from the outer end of the annular lid 701 in the radial direction. The inner lateral surface (proximal-end lateral surface) of the annular lid 701 is in contact with the distal-end side end faces of the holder distal end 573 and the distal end 432. The annular side wall 702 is in contact with the cylindrical portion distal end 430 over the entire circumference from outward in the radial direction. As illustrated in FIG. 12, an opening 703 is provided at a position, corresponding to the hook 436, of the annular side wall 702. The hook 436 is inserted into the opening 703, thus the cover cap 700*d* and the ink-outlet forming portion 400*d* are engaged with each other.

In the ink refill container 200 of the fifth embodiment, the distal-end side end face of the holder member 570*d* and the distal-end side end face of the cylindrical portion 401 are exposed by removing the cover cap 700*d*, and the holder member 570*d* and the cylindrical portion 401 are not fixed by the first engagement portion en1. Therefore, in the ink refill container 200 of the fifth embodiment, the holder member 570*d* and the spring valve 530 can be withdrawn only by removing the cover cap 700*d* without hooking a jig or the like on the stopper projections 574. However, for example, when ink enters the boundary (gap extending in the axial direction) between the holder member 570*d* and the cylindrical portion 401, the holder member 570*d* may be in a state of close contact with the cylindrical portion 401 due to the ink. Even in this situation, the stopper projections 574 are exposed when viewed in the insertion direction, thus a user can easily hook a jig on the stopper projections 574, and can withdraw the holder member 570*d* and the spring valve 530 with the stopper projections 574 in the hooked state.

The ink refill container 200 of the fifth embodiment described above provides the same effect as that of the ink refill container 200 of the first embodiment. In addition, when the cover cap 700*d* is removed, the sealing member 510 and the spring valve 530 are unlikely to be separated and unlikely to be lost because they are held by the holder member 570*d*. In addition, the sealing member 510 and the spring valve 530 can be collectively removed with both held by the holder member 570*d*, thus the work efficiency is high.

F. Sixth Embodiment

Figure 13:
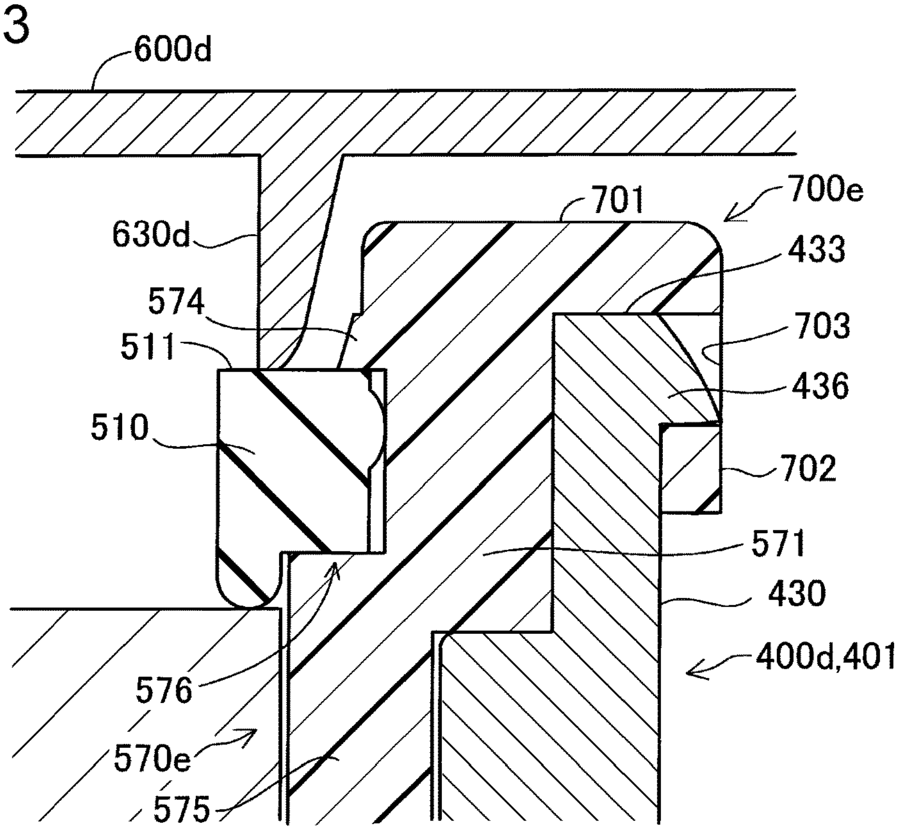
FIG. 13 is an enlarged cross-sectional view schematically illustrating the manner in which portions of an ink refill container of a sixth embodiment are held and fixed.

FIG. 13 is an enlarged cross-sectional view schematically illustrating the manner in which portions of an ink refill container 200 of a sixth embodiment are held and fixed. FIG. 13 illustrates a cross section of the same area as illustrated in FIG. 8.

The ink refill container 200 of the sixth embodiment differs from the ink refill container 200 of the fifth embodiment illustrated in FIG. 12 in that the holder member and the cover cap are integrally formed. Other components of the ink refill container 200 of the sixth embodiment are the same as those of the ink refill container 200 of the fifth embodiment, thus the same components are labeled with the same symbol, and a detailed description thereof is omitted.

A holder member 570*e* of the sixth embodiment differs from the holder member 570*d* of the fifth embodiment in that the distal-end side end of the holder cylindrical portion 571 is continuous to a cover cap portion 700*e*. As with the cover cap 700*d* of the fifth embodiment, the cover cap portion 700*e* includes the annular lid 701, and the annular side wall 702 in which the opening 703 is formed.

The ink refill container 200 of the sixth embodiment described above provides the same effect as that of the ink refill container 200 of the fifth embodiment. In addition, since the cover cap (the cover cap portion 700*e*) is not separated from the holder member 570*e*, the cover cap is unlikely to be lost. Also, the holder member 570*e* and the outlet valve unit 500 can be collectively removed by withdrawing the cover cap portion 700*e*, thus workability is improved. Furthermore, since the holder member 570*e* also serves as a cover cap, an additional separate member is not necessary, and increase in the number of components can be prevented.

G. Seventh Embodiment

Figure 14:
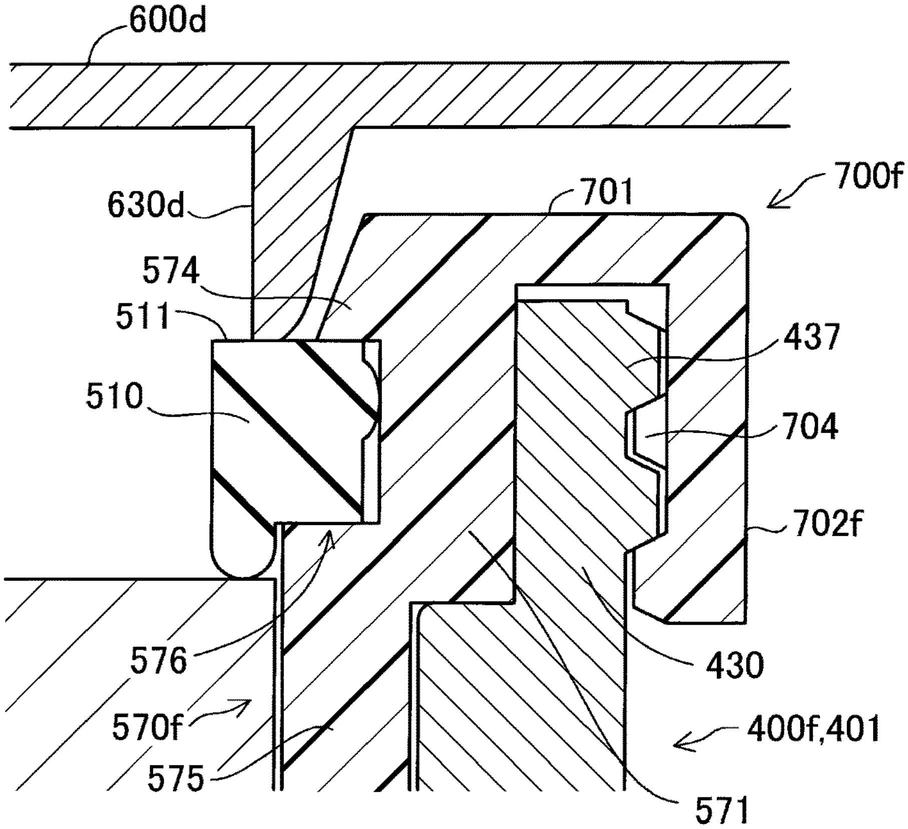
FIG. 14 is an enlarged cross-sectional view schematically illustrating the manner in which portions of an ink refill container of a seventh embodiment are held and fixed.

FIG. 14 is an enlarged cross-sectional view schematically illustrating the manner in which portions of an ink refill container 200 of a seventh embodiment are held and fixed. FIG. 14 illustrates a cross section of the same area as illustrated in FIG. 8.

The ink refill container 200 of the seventh embodiment differs from the ink refill container 200 of the sixth embodiment illustrated in FIG. 13 in that an ink-outlet forming portion 400*f* is included instead of the ink-outlet forming portion 400*d*, and a holder member 570*f* is included instead of the holder member 570*e*. Other components of the ink refill container 200 of the seventh embodiment are the same as those of the ink refill container 200 of the sixth embodiment, thus the same components are labeled with the same symbol, and a detailed description thereof is omitted.

The ink-outlet forming portion 400*f* differs from the ink-outlet forming portion 400*d* of the sixth embodiment in that a thread portion 437 is included instead of the hook 436; however, other components are the same. The thread portion 437 is formed on the outer circumferential surface of the cylindrical portion 401 (the cylindrical portion distal end 430).

The holder member 570*f* differs from the holder member 570*e* of the sixth embodiment in that a cover cap portion 700*f* is included instead of the cover cap portion 700*e*; however, other components are the same. The cover cap portion 700*f* differs from the cover cap 700*e* of the sixth embodiment in that an annular side wall 702*f* is included instead of the annular side wall 702; however, other components are the same. The annular side wall 702*f* differs from the annular side wall 702 of the sixth embodiment in that a thread portion 704 is included instead of the opening 703; however, other components are the same. The thread portion 704 is formed on the inner circumferential surface of the annular side wall 702*f*. The thread portion 437 of the ink-outlet forming portion 400*f*, and the thread portion 704 of the holder member 570*f* (the cover cap portion 700*f*) are screwed to each other. Therefore, in the seventh embodiment, the cover cap (the cover cap portion 700*f*) is thread-engaged with the cylindrical portion 401.

The ink refill container 200 of the seventh embodiment described above provides the same effect as that of the ink refill container 200 of the fifth embodiment. In addition, since the cover cap portion 700*f* is thread-engaged with the cylindrical portion 401 (the cylindrical portion distal end 430), the cover cap portion is unlikely to be deformed as compared to a configuration of claw engagement, thus the possibility of reuse can be improved. Also, an engagement or disengagement operation of the cover cap portion is easy.

H. Eighth Embodiment

Figure 15:
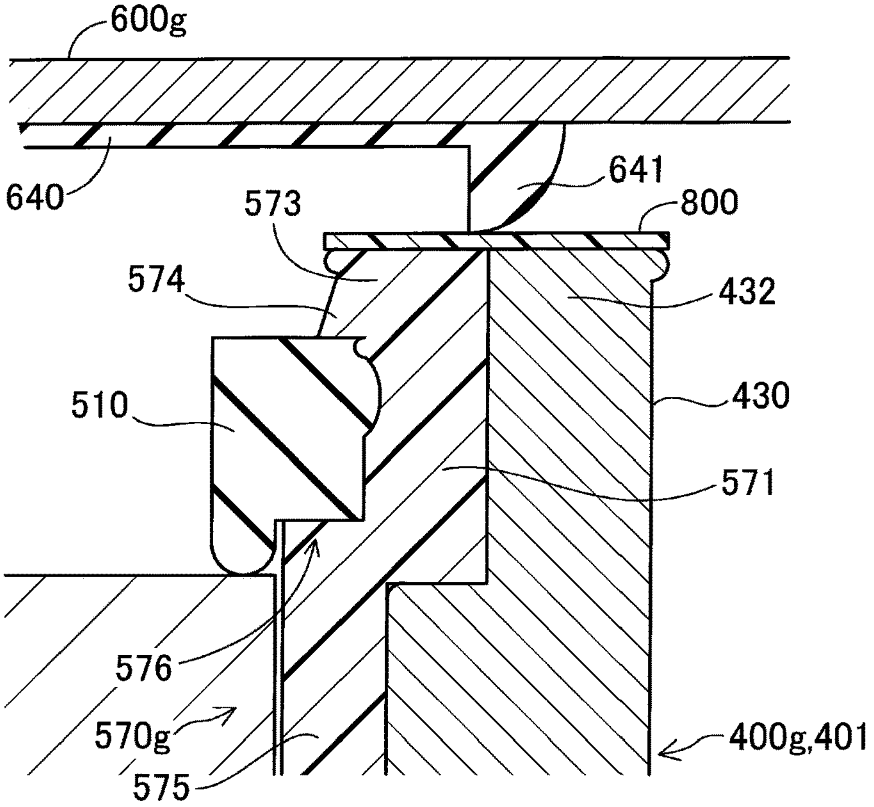
FIG. 15 is an enlarged cross-sectional view schematically illustrating the manner in which portions of an ink refill container of an eighth embodiment are held and fixed.

FIG. 15 is an enlarged cross-sectional view schematically illustrating the manner in which portions of an ink refill container 200 of an eighth embodiment are held and fixed. FIG. 15 illustrates a cross section of the same area as illustrated in FIG. 8.

The ink refill container 200 of the eighth embodiment differs from the ink refill container 200 of the first embodiment in that an ink-outlet forming portion 400*g* is included instead of the ink-outlet forming portion 400, a holder member 570*g* is included instead of the holder member 570, a film member 800 is additionally included, and a cap 600*g* is included instead of the cap 600. Other components of the ink refill container 200 of the eighth embodiment are the same as those of the ink refill container 200 of the first embodiment, thus the same components are labeled with the same symbol, and a detailed description thereof is omitted.

An ink-outlet forming portion 400*g* differs from the ink-outlet forming portion 400 of the first embodiment in that the engagement projection 431 is not provided, and the distal-end side end face of the distal-end section (the distal end 432), and the distal-end side end face of the holder member 570*g* have the same position in the axial direction, and form a single plane together; however, other components are the same.

The holder member 570*g* differs from the holder member 570 of the first embodiment in that the annular groove 572 is not provided, and the distal-end side end face of the holder distal end 573 and the distal-end side end faces of the stopper projections 574 form an integrated single plane without a step; however, other components are the same.

The film member 800 has an annular thin film appearance shape. The film member 800 is made of resin, and functions as a joining member joined to the holder distal end 573, and the cylindrical portion distal end 430. Thus, the holder member 570*g* is fixed to the cylindrical portion 401 by the film member 800. In the present embodiment, the holder member 570*g* and the ink-outlet forming portion 400*g* are combined, and the film member 800 is placed on their distal ends, then heated and weld, thereby joining the film member 800 to the holder distal end 573, and the distal end 432 of the ink-outlet forming portion 400*g* (the cylindrical portion 401).

In the eighth embodiment, the distal-end side end face of the holder member 570*d*, and the distal-end side end face of the cylindrical portion 401 are exposed by removing the film member 800, and the holder member 570*d* and the cylindrical portion 401 are not fixed by the first engagement portion en1. Therefore, in the ink refill container 200 of the eighth embodiment, the holder member 570*g* and the spring valve 530 can be withdrawn only by removing the film member 800 without hooking a jig or the like on the stopper projections 574. However, for example, when ink enters the boundary (gap extending in the axial direction) between the holder member 570*g* and the cylindrical portion 401, the holder member 570*g* may be in a state of close contact with the cylindrical portion 401 due to the ink. Even in this situation, the stopper projections 574 are exposed when viewed in the insertion direction, thus a jig can be easily hooked on the stopper projections 574, and the holder member 570*g* and the spring valve 530 can be withdrawn in the hooked state.

The cap 600*g* includes a cap sealing portion 640 inward of the covering portion 650. The cap sealing portion 640 is composed of a material having elasticity, for example, silicon rubber or butyl rubber. The cap sealing portion 640 has a circular thin film shape in a plan view. An annular claw 641 is formed on the outer circumferential edge of the cap sealing portion 640. The annular claw 641 has the same shape and function as those of the cap sealing portion 630*c* of the fourth embodiment. Therefore, in the cap attached state, the annular claw 641 is in indirect contact with the holder member 570*g* with the film member 800 interposed therebetween to achieve sealing.

The ink refill container 200 of the eighth embodiment described above provides the same effect as that of the ink refill container 200 of the first embodiment. In addition, since the film member 800 as a joining member is joined to the holder distal end 573 of the holder member 570*g* and the cylindrical portion distal end 430, the cylindrical portion 401 (the cylindrical portion distal end 430) does not need to be provided with an engagement portion like a cover cap, thus the structure can be made simple, and increase in size of the cylindrical portion 401 can be prevented. In addition, there is a possibility that ink passing through a gap between members is easily blocked. When the film member 800 is removed, members are unlikely to be separated and unlikely to be lost because the sealing member 510 is held by the holder member 570*g*. Furthermore, once the film member 800 is removed, members can be easily removed by hooking on the stopper projections 574 of the holder member 570*g*. The sealing member 510 and the spring valve 530 can be collectively removed with both held by the holder member 570*g*, thus the work efficiency is high.

I. Ninth Embodiment

Figure 16:
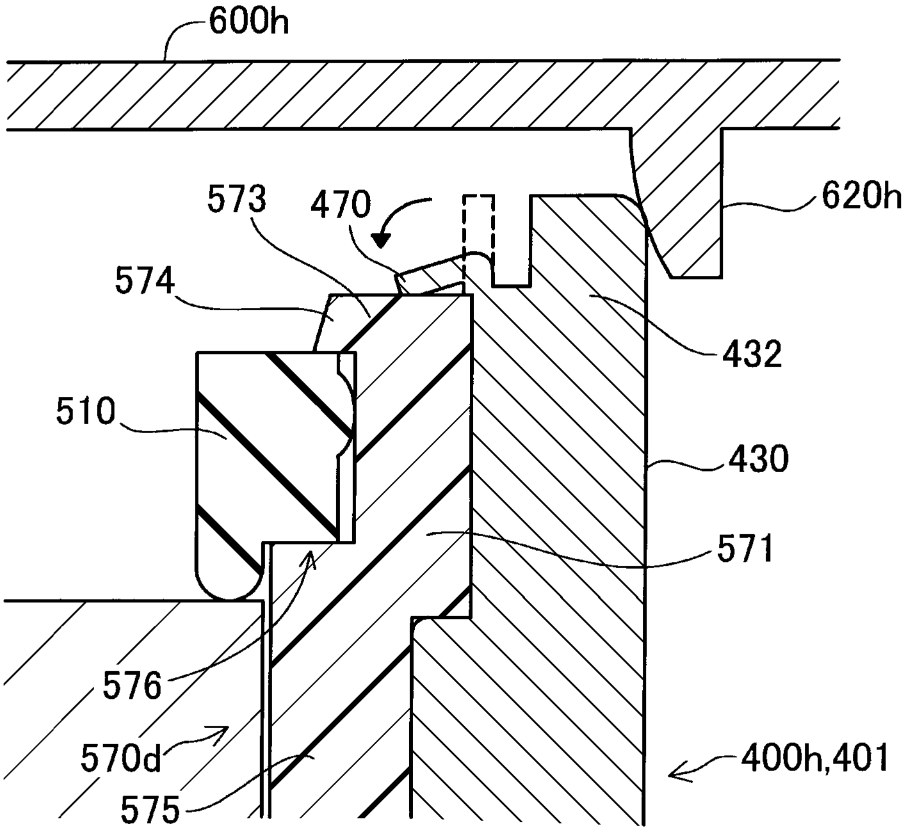
FIG. 16 is an enlarged cross-sectional view schematically illustrating the manner in which portions of an ink refill container of a ninth embodiment are held and fixed.

FIG. 16 is an enlarged cross-sectional view schematically illustrating the manner in which portions of an ink refill container 200 of a ninth embodiment are held and fixed. FIG. 16 illustrates a cross section of the same area as illustrated in FIG. 8.

The ink refill container 200 of the ninth embodiment differs from the ink refill container 200 of the first embodiment in that the holder member 570*d* is included instead of the holder member 570, an ink-outlet forming portion 400*h* is included instead of the ink-outlet forming portion 400, and a cap 600*h* is included instead of the cap 600. Other components of the ink refill container 200 of the ninth embodiment are the same as those of the ink refill container 200 of the first embodiment, thus the same components are labeled with the same symbol, and a detailed description thereof is omitted.

The holder member 570*d* has the same configuration as that of the holder member 570*d* of the fifth embodiment illustrated in FIG. 12. Thus, a detailed description thereof is omitted.

The ink-outlet forming portion 400*h* differs from the ink-outlet forming portion 400 of the first embodiment in that the engagement projection 431 is not provided, and a plurality of swaging portions 470 are provided radially inward of the distal end 432; however, other components are the same. The swaging portions 470 are provided at multiple positions along the inner circumference of the cylindrical portion 401. Specifically, the plurality of swaging portions 470 are disposed apart from each other by a predetermined interval in the circumferential direction. Each swaging portion 470 is configured to be bendable inward in the radial direction. In the present embodiment, with the ink-outlet forming portion 400*h* and the holder member 570*d* assembled, all swaging portions 470 are bended inward in the radial direction, and in contact with the distal-end side end face of the holder distal end 573 of the holder member 570*d*. In this manner, bending the swaging portions 470 causes withdrawal (movement in the withdrawal direction) of the holder member 570*d* to be restricted with the holder member 570*d* attached inside the cylindrical portion 401.

The cap 600*h* differs from the cap 600 of the first embodiment in that a sealing wall 620*h* is included instead of the annular groove 620; however, other components are the same. The sealing wall 620*h* has an annular wall appearance shape extending in the insertion direction inward of the cap 600*h* (inward of the covering portion 650). In the cap attached state, the inner circumferential surface of the sealing wall 620*h* is in contact with the outer circumferential surface of the distal end 432 of the ink-outlet forming portion 400*h* to achieve sealing.

The ink refill container 200 of the ninth embodiment described above provides the same effect as that of the ink refill container 200 of the first embodiment. In addition, withdrawal (release) of the holder member 570*d* is restricted by the swaging portions 470, thus withdrawal of the holder member 570*d* and the outlet valve unit 500 is unlikely to occur. When the holder member 570*d* is removed, the sealing member and the valve can be easily removed by returning the swaging portions 470 to the original state or cutting off the swaging portions 470. A separate member does not need to be used for fixing the holder member 570*d* to the cylindrical portion 401, thus increase in the number of components can be prevented.

J. Tenth Embodiment

Figure 17:
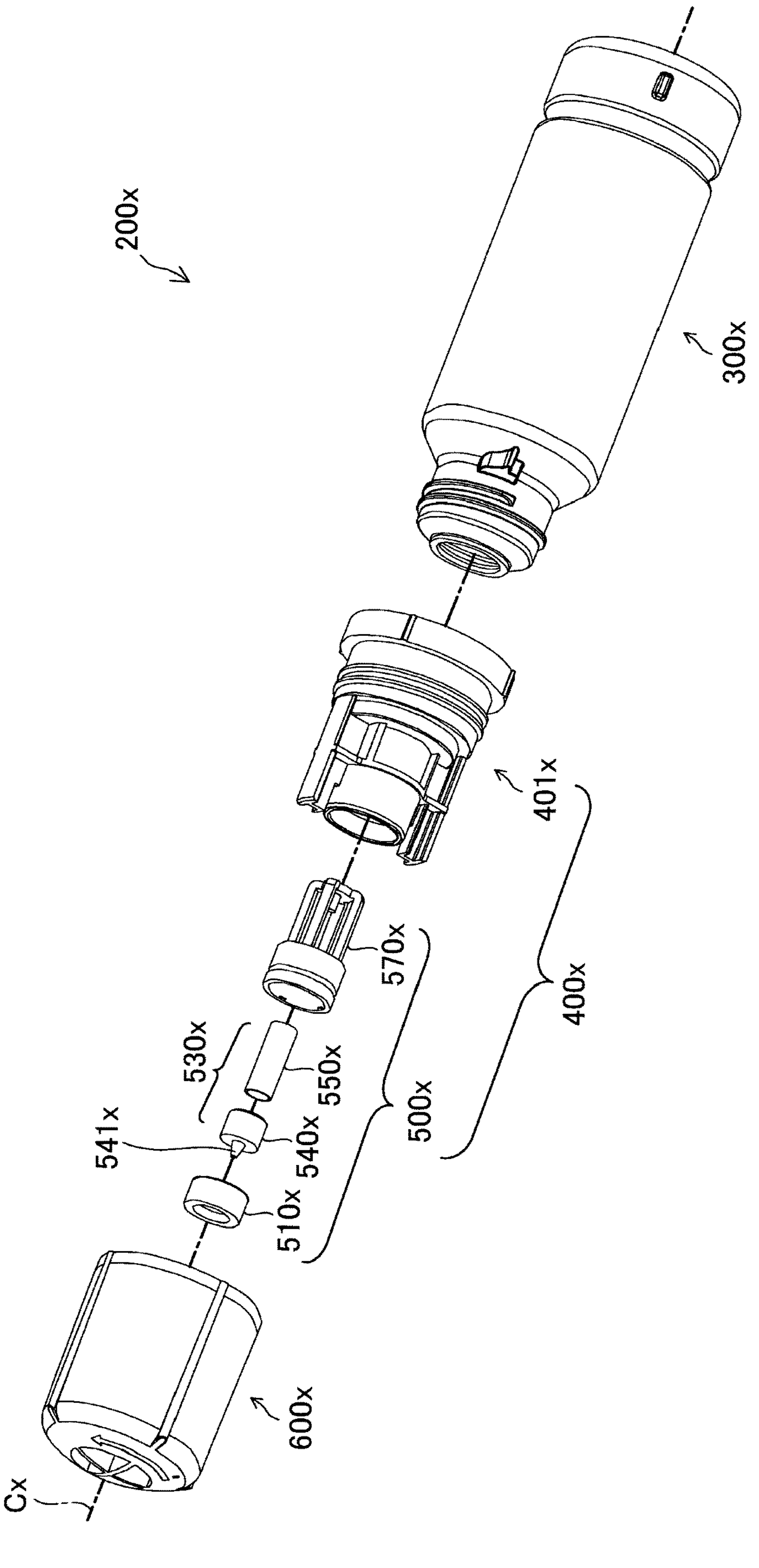
FIG. 17 is an exploded perspective view of an ink refill container of a tenth embodiment.

FIG. 17 is an exploded perspective view of an ink refill container 200*x* in a tenth embodiment. The ink refill container 200*x* includes an ink-outlet forming portion 400*x*, a container body portion 300*x*, and a cap 600*x*. The container body portion 300*x* differs from the container body portion 300 of the first embodiment in appearance shape, but is substantially equivalent to the container body portion 300 in functionality. Similarly, the cap 600*x* differs from the cap 600 of the first embodiment in appearance shape, but is substantially equivalent to the cap 600 in functionality.

The ink-outlet forming portion 400*x* includes a cylindrical portion 401*x*, and an outlet valve unit 500*x*. The cylindrical portion 401*x* differs from the cylindrical portion 401 of the first embodiment in appearance shape, but is substantially equivalent to the cylindrical portion 401 in functionality.

The outlet valve unit 500*x* includes a sealing member 510*x*, a spring valve 530*x*, and a holder member 570*x*.

Figure 18:
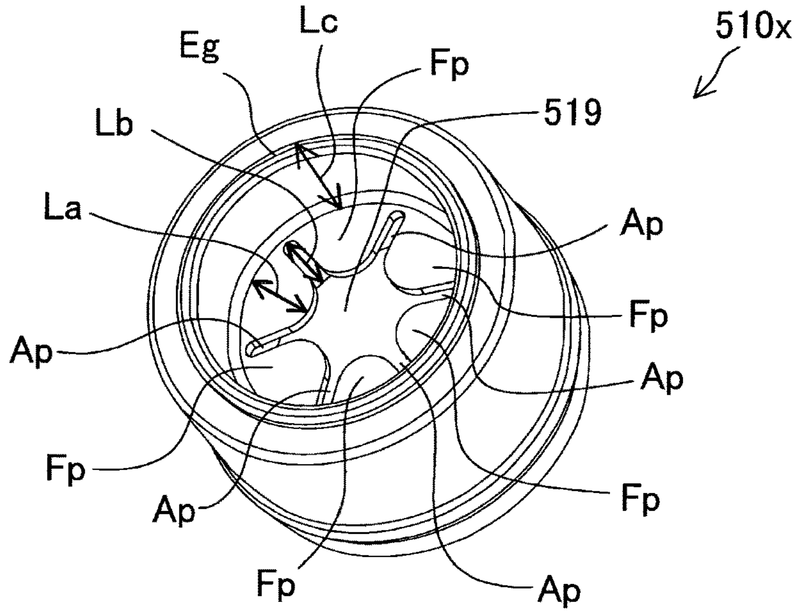
FIG. 18 is a perspective view of a sealing member of the tenth embodiment.

FIG. 18 is a perspective view of the sealing member 510*x* in the tenth embodiment. The sealing member 510*x* has an approximately ring shape. The sealing member 510*x* may be composed of, for example, a rubber member (elastomer) having rubber elasticity. The sealing member 510*x* has an opening through which the ink inlet flow-path member 910 is insertable and removable. The sealing member 510*x* is attached inside the cylindrical portion 401*x*. The sealing member 510*x* is positioned closer to the distal end than a spring member 550*x* in the axial direction that is the direction along a central axis Cx of the ink refill container 200*x*.

The sealing member 510*x* has an annular sealing end Eg which is in contact with a valve body 540*x* in the "closed valve state". The sealing member 510*x* has a sealing member through-hole 519 at the center. The sealing member 510*x* has six elastic membrane portions Fp which are separated by six slit-shaped apertures Ap radially extending from the center when viewed in the axial direction from the distal-end which is close to the ink outlet 460. Thus, when the ink refill container 200*x* is withdrawn from the ink inlet flow-path member 910, rise of ink from the ink inlet flow-path member 910 is prevented by the elastic membrane portions Fp which attempt to restore from elastic deformation, thus ink drooping can be reduced. In addition, ink is likely to be held due to the capillary action of the slit-shaped apertures Ap, thus ink drooping can be unlikely to occur.

A length La from the root of each elastic film Fp to the central distal end in the radial direction is shorter than a length Lc from the root of each elastic film Fp of the sealing member 510*x* to the sealing end Eg in the direction of the central axis. Thus, in the "open valve state" achieved by the ink inlet flow-path member 910 pressing to open the valve body 540*x*, it is easy to avoid interference of the distal end of the elastically deformed elastic film Fp with the flow of ink and gas between the flow path of the ink inlet flow-path member 910 and the inside of the container body portion 300.

Figure 19:
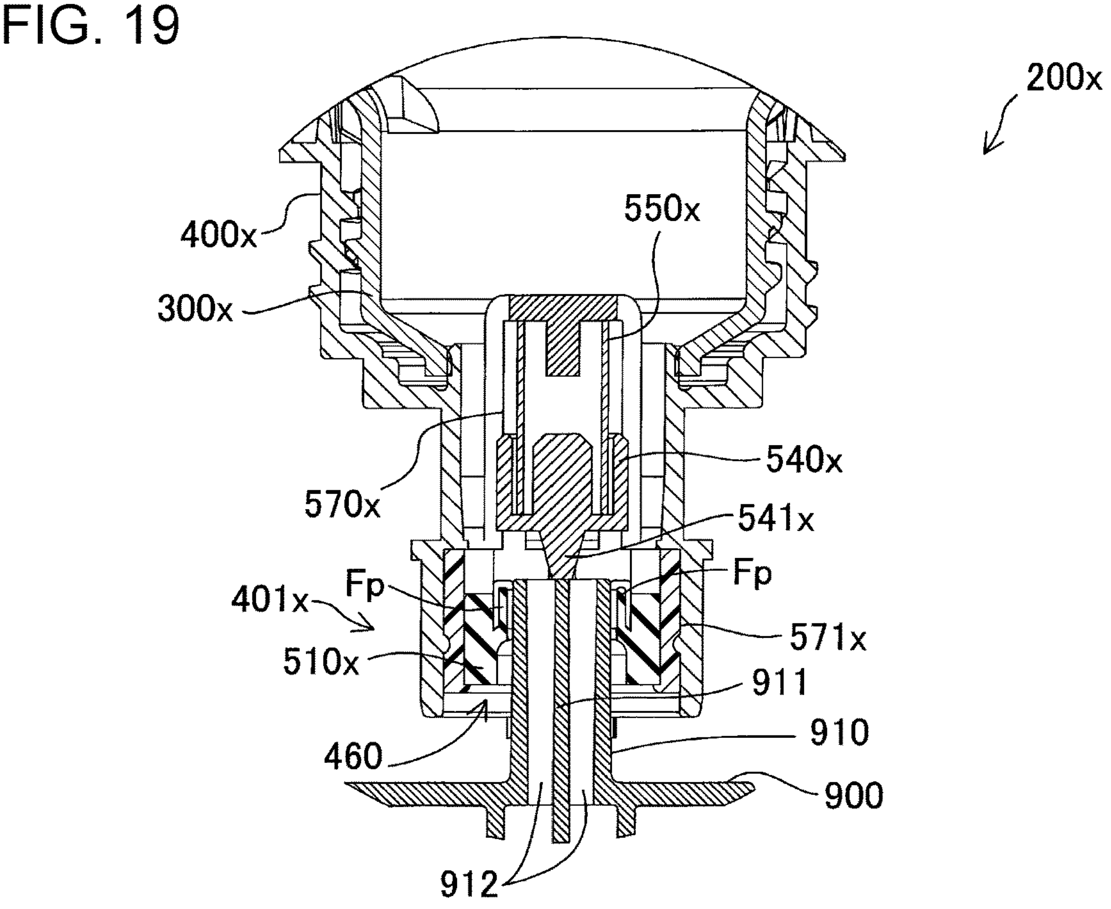
FIG. 19 is an enlarged cross-sectional view illustrating the coupling portion between an ink inlet flow-path member and the ink refill container in an ink refilling state.

FIG. 19 is an enlarged cross-sectional view illustrating the coupling portion between the ink inlet flow-path member 910 and the ink refill container 200*x* in the ink refilling state. FIG. 19 illustrates a cross section including the central axis Cx. In the ink refilling state, the ink inlet flow-path member 910 is inserted into the cylindrical portion 401*x* through the ink outlet 460. As illustrated in FIG. 19, in the sealing member 510*x*, each elastic film Fp is elastically deformed to be bent in the insertion direction to allow insertion of the ink inlet flow-path member 910. Two flow paths 912 divided by a divider 911 are formed inside the ink inlet flow-path member 910. At the time of ink refilling, one of the flow paths is used as an ink flow path from the ink refill container 200*x* to the ink tank 900, and the other flow path is used as a gas flow path from the ink tank 900 to the ink refill container 200*x*. When a flow path forming projection 541*x* at the distal end of the valve body 540*x* is pressed in the insertion direction by the distal end of the divider 911 in the insertion direction, the valve body 540*x* is moved in the insertion direction, and the inside of the container body portion 300*x* and the inside (the flow path 912) of the ink inlet flow-path member 910 communicate with each other.

Figure 20:
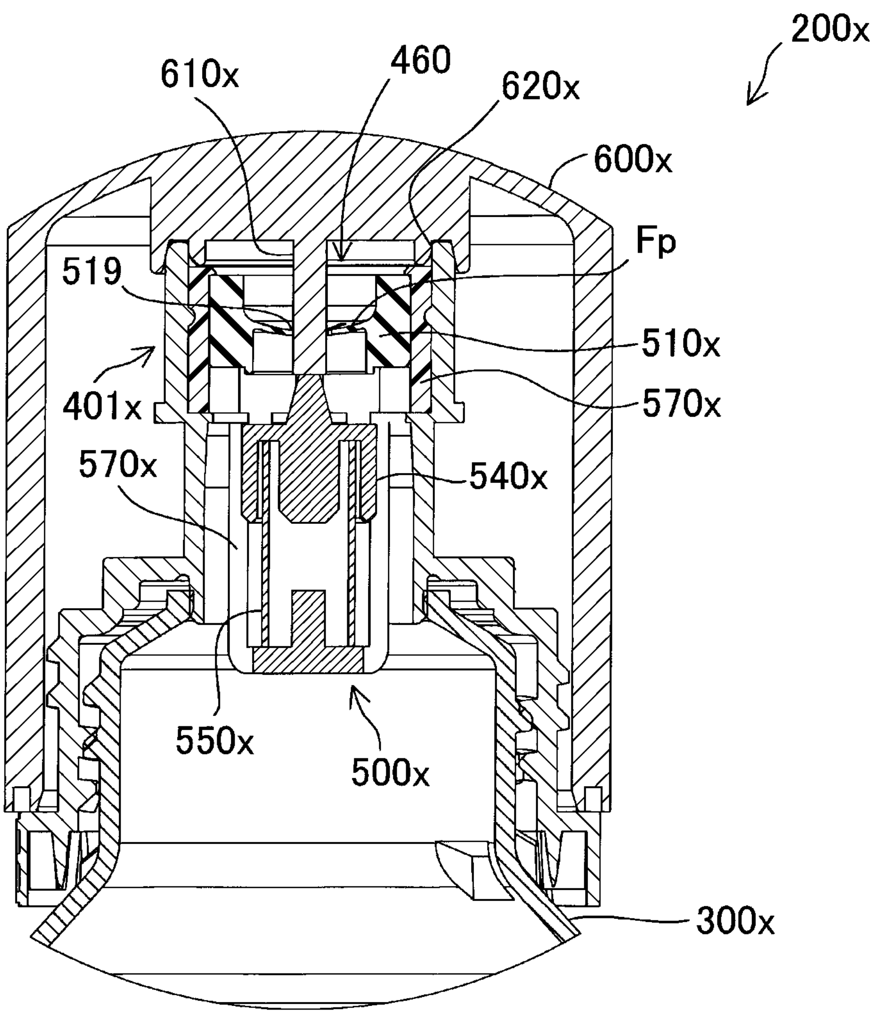
FIG. 20 is an enlarged cross-sectional view illustrating the coupling portion between a cap and an ink-outlet forming portion in a cap attached state.

FIG. 20 is an enlarged cross-sectional view illustrating the coupling portion between the cap 600*x* and the ink-outlet forming portion 400*x* in the cap attached state. As with the cap 600 of the first embodiment, the cap 600*x* includes a cap projection 610*x* and an annular groove 620*x*. In the present embodiment, the outer diameter of the cap projection 610*x* is substantially equal to the diameter (the length in the radial direction in the area where the radial length is the greatest) of the sealing member through-hole 519 in the sealing member 510*x*. Therefore, in the cap attached state, each elastic film Fp is not elastically deformed. Also, in the ink refill container 200*x* of the tenth embodiment, in the cap attached state, the cap projection 610*x* is inserted into the inside of the cylindrical portion 401*x* through the ink outlet 460 and the sealing member through-hole 519, and comes into contact with the distal end of the valve body 540*x*.

The ink refill container 200 of the tenth embodiment described above provides the same effect as that of the ink refill container 200 of the first embodiment. In addition, when the ink inlet flow-path member 910 of the printer 100 is inserted into the cylindrical portion 401*x* of the ink refill container 200*x*, the elastic membrane portions Fp are elastically deformed and opened while the through-hole 519 of the sealing member 510*x*, and the slit-shaped apertures Ap are being expanded. Thus, when the ink inlet flow-path member 910 is withdrawn from the cylindrical portion 401*x*, the elastic membrane portions Fp in a process of restoring from an elastic deformation state remove the ink which has adhered to the outer surface of the ink inlet flow-path member 910, and cut off ink connection between the ink outlet 460 and the ink inlet flow-path member 910. Consequently, ink drooping can be reduced. In addition, ink is likely to be held due to the capillary action of the slit-shaped apertures Ap, by which ink drooping is likely to be prevented.

K. Other Embodiments (K1) In the embodiments excluding the second embodiment from the above-described embodiments, the holder members 570, 570*a* to 570*g*, 570*x* hold both the spring valves 530, 530*x* and the sealing members 510, 510*c*, 510*x*. In the second embodiment, the holder member 570 holds only the sealing member 510 between the spring valve 530 and the sealing member 510. The present disclosure is not limited to these, and the holder members 570, 570*a* to 570*g*, 570*x* may be configured to hold only the spring valves 530, 530*x* between the spring valves 530, 530*x* and the sealing members 510, 510*c*, 510*x*.

(K2) In the first to third embodiments, the fixing portion fx is configured by the first engagement portions en1, en1*a* and the two step portions 585, 402; however, the two step portions 585, 402 may be omitted and the fixing portion fx may be configured only by the first engagement portion en1.

(K3) In each embodiment, instead of the spring valves 530, 530*x*, a valve having any structure may be used, the structure allowing the open valve state and the closed valve state to be switched according to insertion and removal of the ink inlet flow-path member 910 and the cap projections 610, 610*x*.

(K4) In each embodiment, instead of the plurality of stopper projections 574, 574*a*, annular projections may be used, which project inward in the radial direction over the entire circumference. With such a configuration, the sealing members 510, 510*c*, 510*x* can be firmly fixed by the holder members 570, 570*a* to 570*g*, 570*x*.

(K5) In each embodiment, the sealing member restricting portion 577 may be excluded from the sealing member holding portion 576. Also, in such a configuration, the sealing member holding portion 576 includes the second engagement portion 578 and the stopper projections 574, 574*a*, thus can hold the sealing members 510, 510*c*, 510*x*.

(K6) In the fourth to seventh embodiments, the cap sealing portions 630*c*, 630*d* may not be provided. Also, in the eighth embodiment, the annular claw 641 may not be provided. Also, in each embodiment, the caps 600, 600*c*, 600*d*, 600*g*, 600*h*, 600*x* may not be provided. Also, in the eighth embodiment, the cap sealing portion 640 may not be provided.

(K7) In the eighth embodiment, the holder member 570*g* and the ink-outlet forming portion 400*g* (the cylindrical portion 401) are fixed to each other by welding of the film member 800; however, the present disclosure is not limited to this. Instead of the film member 800, an annular sheet member may be prepared, and the holder member 570*g* and the ink-outlet forming portion 400*g* (the cylindrical portion 401) may be fixed by bonding the above-mentioned sheet member to the distal-end side end of the assembly of the holder member 570*g* and the ink-outlet forming portion 400*g*.

(K8) In the ninth embodiment, instead of the ink-outlet forming portion 400*h* or along with the ink-outlet forming portion 400*h*, the holder member 570*d* may be configured to include the swaging portions 470. In the ninth embodiment, all the swaging portions 470 are bent inward in the radial direction, and come in contact with the distal-end side end face of the holder distal end 573 of the holder member 570*d*; however, only part of the swaging portions 470 may be bent. In such a configuration, when the ink refill containers 200, 200*x* are reused, those swaging portions 470 that have not been bent can be used. Specifically, those swaging portions 470 which have been bent to withdraw the holder member 570*d* and the spring valve 530 may be eliminated, and after the inside of the container body portion 300 is cleansed, the remaining swaging portions 470 may be bent again with the holder member 570*d* and the spring valve 530 inserted. By adopting such a configuration, when the ink refill container 200 is reused, fixation between the holder member 570*d* and the ink-outlet forming portion 400*h* (the cylindrical portion 401) is achieved. Note that a configuration may be adopted in which a single swaging portion is provided over the entire circumference instead of the plurality of swaging portions 470.

(K9) In the tenth embodiment, the sealing member 510*x* includes six elastic membrane portions Fp separated by six slit-shaped apertures Ap; however, the present disclosure is not limited to this. As long as the operational effect of the present disclosure is implemented, the sealing member 510*x* may include any number of elastic membrane portions Fp separated by any number of slit-shaped apertures Ap, and the number is not limited to six. For example, a configuration may be adopted in which one slit obtained by connecting the center and a slit-shaped aperture with a straight line is provided, and two elastic membrane portions Fp are provided across such a slit. Alternatively, a configuration may be adopted in which a slit-shaped aperture is provided in the radial direction of 180° across the center.

The present disclosure is not limited to the foregoing embodiments and can be implemented with various configurations within a scope not departing from the spirit. For example, the present disclosure can be implemented with the following configurations. The technical features in the foregoing embodiments, corresponding to the technical features of the configurations described below may be replaced, or combined as appropriate to solve some or all of the problems of the present disclosure or to achieve some or all of the effects of the present disclosure. Unless technical features are explained in the present specification as essential ones, they can be omitted as appropriate.

L. Other Configurations (1) According to an aspect of the present disclosure, an ink refill container for refilling a printer having an ink inlet flow-path member with ink is provided. The ink refill container includes: a container body portion configured to store ink; and an ink-outlet forming portion coupled to the container body portion and having a cylindrical portion forming an ink outlet. The ink-outlet forming portion includes: a valve disposed in the cylindrical portion and configured to be opened by the ink inlet flow-path member inserted in the cylindrical portion and to be closed by withdrawal of the ink inlet flow-path member from the cylindrical portion; a sealing member disposed at the ink outlet and configured to be in contact with the valve in a closed state of the valve; a holder member configured to hold at least one of the valve and the sealing member; and a fixing portion configured to fix the holder member to the cylindrical portion. In the ink refill container with this configuration, when the holder member is removed from the ink-outlet forming portion, at least one of the valve and the sealing member can be removed together, thus removal work is made easy. In addition, as compared to when members are individually removed, occurrence of loss of members can be reduced. Because of these reasons, replacement of a member, cleansing of the ink refill container, and ink refilling are made easy.

(2) In the ink refill container with the above configuration, the fixing portion may include a first engagement portion between the holder member and an inner circumferential surface of the cylindrical portion, the holder member may include a second engagement portion disposed in an inner circumferential surface of the holder member to be engaged with the sealing member, and a stopper projection that is configured to be in contact with a distal end of the sealing member to restrict the withdrawal of the sealing member, and the stopper projection may be positioned between a center of the ink outlet and a distal-end face of the cylindrical portion in a radial direction of the ink outlet when viewed in an insertion direction opposite to the withdrawal from the ink outlet. With the ink refill container in this configuration, the stopper projections of the holder member are exposed when viewed in the insertion direction, thus, for example, at least one of the valve and the sealing member, and the holder member (hereinafter referred to as the "holder member and the like") are easily removed through the ink outlet by hooking on the stopper projections. When the holder member and the like are removed, the valve can be easily removed. In addition, the holder member and the like can be removed through the ink outlet without releasing the connection between the ink-outlet forming portion and the container body portion, thus removal work is made easy. In addition, since the holder member is engaged with the cylindrical portion via the engagement portion possessed by the holder member itself, an additional fixing member is not necessary, and a simple structure can be implemented with reduced number of components.

(3) In the ink refill container with the above configuration, the holder member may include a valve holding portion configured to hold the valve. With the ink refill container in this configuration, the holder member and the valve can be collectively removed by only removing the holder member. In addition, for attachment, with the valve held by the holder member, both can be collectively attached through the ink outlet, thus attachment work is also made easy.

(4) In the ink refill container with the above configuration, the stopper projection may overlap with an entirety of the distal end of the sealing member in the radial direction of the ink outlet when viewed in the insertion direction. With the ink refill container in this configuration, withdrawal (release) of the sealing member can be more tightly restricted. In addition, when the holder member is removed, the sealing member is unlikely to be detached from the holder member, thus the holder member and the sealing member are likely to be collectively removed favorably.

(5) In the ink refill container with the above configuration, the holder member may include a sealing member restricting portion that restricts movement of the sealing member in the insertion direction. With the ink refill container in this configuration, movement of the sealing member toward the container body portion in the insertion direction can be restricted by a force with which the ink inlet flow-path member in the printer is inserted through the ink outlet.

(6) In the ink refill container with the above configuration, the first engagement portion may be configured as a thread engagement portion. With the ink refill container in this configuration, providing an engagement portion such as a recess in the distal-end face of the holder member allows the holder member to be turned by engaging a jig such as a flathead screwdriver with the engagement portion when the holder member is withdrawn, thus the holder member is easily withdrawn through the ink outlet. Similarly, attachment of the holder member is easy.

(7) In the ink refill container with the above configuration, the holder member may include a valve holding portion configured to hold the valve, the sealing member may include the fixing portion, and the sealing member may be configured to be withdrawn from the cylindrical portion to an outside through the ink outlet, and may include a third engagement portion closer to a distal end of the cylindrical portion than the holder member in a direction of the withdrawal, the third engagement portion being engageable with an inner circumferential surface of the cylindrical portion. With the ink refill container in this configuration, the sealing member also serves as a fixing portion that fixes the holder member to the cylindrical portion, thus an additional member is not necessary for a fixing portion, and increase in the number of components can be prevented, and the structure can be made simple. Since the holder member holds the valve, the holder member and the valve can be collectively removed by removing the sealing member through the ink outlet, thus withdrawal work is made easy.

(8) In the ink refill container with the above configuration, the sealing member may include a sealing member distal end which projects outward further than the distal end of the cylindrical portion in the direction of the withdrawal, and the sealing member distal end may include a projection that extends outward in a radial direction of the cylindrical portion, and overlaps with the distal end of the cylindrical portion. With the ink refill container in this configuration, the projection of the sealing member is disposed outward (close to the ink outlet) of the cylindrical portion, thus the sealing member is easily removed by gripping the projection.

(9) In the ink refill container with the above configuration, a cap configured to be attached to the ink-outlet forming portion may be further included, and the cap may include a cap sealing portion that, in an attached state, is in contact with a distal end of the sealing member to achieve sealing. With the ink refill container in this configuration, in the state in which the cap is attached, the cap sealing portion is in contact with the distal end of the sealing member, thus the possibility of detachment of the sealing member can be reduced at the time of distribution or at the time of storage of the ink refill container, thus withdrawal (release) of the valve or ink leakage can be prevented.

(10) In the ink refill container with the above configuration, the fixing portion may include a cover cap that covers, from an outside, a holder distal end that is a distal end of the holder member in the direction of the withdrawal, and a cylindrical portion distal end that is a distal end of the cylindrical portion in the direction of the withdrawal to engage with an outer circumferential surface of the cylindrical portion, the holder member may include a valve holding portion configured to hold the valve, and a sealing member holding portion configured to hold the sealing member, and the sealing member holding portion may include a holder engagement portion configured to be engaged with a sealing member engagement portion formed on an outer circumferential surface of the sealing member, and a stopper projection configured to be in contact with a distal end of the sealing member to restrict the withdrawal of the sealing member. With the ink refill container in this configuration, when the cover cap is removed, the sealing member and the valve are unlikely to be separated and unlikely to be lost because they are held by the holder member. In addition, the sealing member and the valve can be collectively removed with both held by the holder member, thus the work efficiency is high.

(11) In the ink refill container with the above configuration, a cap configured to be attached to the ink-outlet forming portion may be further included, and the cap may include a cap sealing portion that, in an attached state, is in contact with a distal end of the sealing member to achieve sealing. With the ink refill container in this configuration, in the state in which the cap is attached, the cap sealing portion is in contact with the distal end of the sealing member, thus the possibility of detachment of the sealing member is reduced at the time of distribution or at the time of storage of the ink refill container, thus withdrawal (release) of the valve or ink leakage can be prevented.

(12) In the ink refill container with the above configuration, the cover cap may be formed integrally with the holder member. With the ink refill container in this configuration, the cover cap is not separated from the holder member, thus the cover cap is unlikely to be lost. Also, the holder member and the like can be collectively removed by withdrawing the cover cap, thus workability is improved. Furthermore, since the holder member also serves as a cover cap, an additional separate member is not necessary, and increase in the number of components can be prevented.

(13) In the ink refill container with the above configuration, the cover cap may be thread-engaged with the cylindrical portion. With the ink refill container in this configuration, the cover cap is unlikely to be deformed as compared to a claw engagement, thus the possibility of reuse can be improved. Also, an engagement or disengagement operation of the cover cap is easy.

(14) In the ink refill container with the above configuration, the fixing portion may include a joining member joined to a holder distal end that is a distal end of the holder member of the cylindrical portion in the direction of the withdrawal, and a cylindrical portion distal end that is a distal end of the cylindrical portion in the direction of the withdrawal, the holder member may include a valve holding portion configured to hold the valve, and a sealing member holding portion configured to hold the sealing member, and the sealing member holding portion may include a holder engagement portion configured to be engaged with a sealing member engagement portion formed on an outer circumferential surface of the sealing member, and a stopper projection configured to be in contact with a distal end of the sealing member to restrict movement of the sealing member in the direction of the withdrawal. With the ink refill container in this configuration, a joining member is joined to the cylindrical portion, thus the cylindrical portion does not need to be provided with an engagement portion like a cover cap, thus the structure can be made simple, and increase in size of the cylindrical portion can be prevented. In addition, there is a possibility that ink passing through a gap between members is easily blocked. When the joining member is removed, members are unlikely to be separated and unlikely to be lost because the sealing member is held by the holder member. Furthermore, when the joining member is removed, the holder member can be easily removed by hooking on stopper projections of the holder member At least one of the sealing member and the valve can be collectively removed with members held by the holder member, thus the work efficiency is high.

(15) In the ink refill container with the above configuration, joining by the joining member may be selected from welding of a film member and bonding of a sheet member. With the ink refill container in this configuration, when welding of the film member is selected, the bonding strength can be increased and withdrawal of the holder member is unlikely to occur. When bonding of the sheet member is selected, as compared to welding, members are not melted, thus are not deformed, which facilitates reuse of the ink-outlet forming portion and the holder member.

(16) In the ink refill container with the above configuration, a cap configured to be attached to the ink-outlet forming portion may be further included, and the cap may include a cap sealing portion having elasticity that, in an attached state, is in contact with a distal end of the holder member to achieve sealing. In general, the holder member is composed of a rigid member, thus the ink refill container in this configuration is likely to hold a high sealing property with the cap attached because the cap includes a cap sealing portion having elasticity. Since the cap sealing portion comes into contact with the holder member distal end to achieve sealing, the possibility of detachment of the holder member is reduced at the time of distribution, and withdrawal (release) of the sealing member and the valve or ink leakage can be prevented.

(17) In the ink refill container with the above configuration, the holder member may include a valve holding portion configured to hold the valve, and a sealing member holding portion that holds the sealing member, the sealing member holding portion may include a holder engagement portion configured to engage with a sealing member engagement portion disposed on an outer circumferential surface of the sealing member, and a stopper projection configured to be in contact with a distal end of the sealing member to restrict the withdrawal of the sealing member, at least one of a distal end of the cylindrical portion and a distal end of the holder member may include a swaging portion bendable to the other side, the fixing portion may be comprised of the swaging portion, and the swaging portion may be bent to restrict the withdrawal of the holder member with the holder member mounted in the cylindrical portion. With the ink refill container in this configuration, withdrawal (release) of the holder member is restricted by the swaging portions, thus withdrawal of the holder member and the like is unlikely to occur. When the holder member is removed, the sealing member and the valve can be easily removed by returning the swaging portions to the original state or cutting off the swaging portions. A separate member does not need to be used for fixing the holder member to the cylindrical portion, thus increase in the number of components can be prevented.

(18) In the ink refill container with the above configuration, the swaging portion may be disposed at a plurality of positions along an inner circumference of the cylindrical portion. With the ink refill container in this configuration, when the ink refill container is reused, reuse for multiple times is made possible by using the swaging portions which have not been used for swaging before the last time.

(19) In the ink refill container with the above configuration, the sealing member may include a central portion having a through-hole, and a plurality of elastic membrane portions having elasticity separated by slit-shaped gaps extending radially from the central portion. With the ink refill container in this configuration, when the ink inlet flow-path member of the printer is inserted into the cylindrical portion of the ink refill container, the elastic membrane portions are elastically deformed and opened while the through-hole of the sealing member, and the slit-shaped apertures are being expanded. Thus, when the ink inlet flow-path member is withdrawn from the cylindrical portion, the elastic membrane portions in a process of restoring from an elastic deformation state remove the ink which has adhered to the outer surface of the ink inlet flow-path member, and cut off ink connection between the ink outlet and the ink inlet flow-path member. Consequently, ink drooping can be reduced. In addition, ink is likely to be held due to the capillary action of the slit-shaped apertures, by which ink drooping is likely to be prevented.

In addition to the above configurations, the present disclosure can be implemented with a configuration such as a method of manufacturing an ink refill container.

What is claimed is:

1. An ink refill container for refilling a printer having an ink inlet flow-path member with ink, the ink refill container comprising:

- a container body portion configured to store ink; and
- an ink-outlet forming portion coupled to the container body portion and having a cylindrical portion forming an ink outlet,
- the ink-outlet forming portion including:
  - a valve disposed in the cylindrical portion, the valve being configured to be opened by the ink inlet flow-path member inserted in the cylindrical portion and closed by withdrawal of the ink inlet flow-path member from the cylindrical portion;
  - a sealing member disposed at the ink outlet, the sealing member configured and arranged to be in contact with the valve in a closed state of the valve;
  - a holder member configured to hold at least one of the valve and the sealing member; and
  - a fixing portion configured to fix the holder member to the cylindrical portion, wherein the fixing portion includes a first engagement portion between the holder member and an inner circumferential surface of the cylindrical portion, the holder member includes a second engagement portion disposed in an inner circumferential surface of the holder member to be engaged with the sealing member, and a stopper projection that is configured to be in contact with a distal end of the sealing member to restrict the withdrawal of the sealing member, and the stopper projection is positioned between a center of the ink outlet and a distal-end face of the cylindrical portion in a radial direction of the ink outlet when viewed in an insertion direction opposite to the withdrawal from the ink outlet.

2. The ink refill container according to claim 1, wherein the holder member includes a valve holding portion configured to hold the valve.

3. The ink refill container according to claim 1, wherein the stopper projection overlaps with an entirety of the distal end of the sealing member in the radial direction of the ink outlet when viewed in the insertion direction.

4. The ink refill container according to claim 1, wherein the holder member includes a sealing member restricting portion that restricts movement of the sealing member in the insertion direction.

5. The ink refill container according to claim 1, wherein the first engagement portion is configured as a thread engagement portion.

6. An ink refill container for refilling a printer having an ink inlet flow-path member with ink, the ink refill container comprising:

a container body portion configured to store ink; and an ink-outlet forming portion coupled to the container body portion and having a cylindrical portion forming an ink outlet, the ink-outlet forming portion including:

a valve disposed in the cylindrical portion, the valve being configured to be opened by the ink inlet flow-path member inserted in the cylindrical portion and closed by withdrawal of the ink inlet flow-path member from the cylindrical portion;

a sealing member disposed at the ink outlet, the sealing member configured and arranged to be in contact with the valve in a closed state of the valve;

a holder member configured to hold at least one of the valve and the sealing member; and a fixing portion configured to fix the holder member to the cylindrical portion, wherein the holder member includes a valve holding portion configured to hold the valve, the sealing member serves as the fixing portion, and the sealing member is configured to be withdrawn from the cylindrical portion to an outside through the ink outlet, and includes a third engagement portion closer to a distal end of the cylindrical portion than the holder member in a direction of the withdrawal, the third engagement portion being engageable with an inner circumferential surface of the cylindrical portion.

7. The ink refill container according to claim 6, wherein the sealing member includes a sealing member distal end which projects outward further than the distal end of the cylindrical portion in the direction of the withdrawal, and the sealing member distal end includes a projection that extends outward in a radial direction of the cylindrical portion, and overlaps with the distal end of the cylindrical portion.

8. The ink refill container according to claim 6, further comprising a cap configured to be attached to the ink-outlet forming portion, wherein the cap includes a cap sealing portion that, in an attached state, is in contact with a distal end of the sealing member to achieve sealing.

9. An ink refill container for refilling a printer having an ink inlet flow-path member with ink, the ink refill container comprising:

a container body portion configured to store ink; and an ink-outlet forming portion coupled to the container body portion and having a cylindrical portion forming an ink outlet, the ink-outlet forming portion including:

a valve disposed in the cylindrical portion, the valve being configured to be opened by the ink inlet flow-path member inserted in the cylindrical portion and closed by withdrawal of the ink inlet flow-path member from the cylindrical portion;

a sealing member disposed at the ink outlet, the sealing member configured and arranged to be in contact with the valve in a closed state of the valve;

a holder member configured to hold at least one of the valve and the sealing member; and a fixing portion configured to fix the holder member to the cylindrical portion, wherein the fixing portion includes a cover cap that covers, from an outside, a holder distal end that is a distal end of the holder member in the direction of the withdrawal, and a cylindrical portion distal end that is a distal end of the cylindrical portion in the direction of the withdrawal to engage with an outer circumferential surface of the cylindrical portion, the holder member includes a valve holding portion configured to hold the valve, and a sealing member holding portion configured to hold the sealing member, and the sealing member holding portion includes a holder engagement portion configured to be engaged with a sealing member engagement portion formed on an outer circumferential surface of the sealing member, and a stopper projection configured to be in contact with a distal end of the sealing member to restrict the withdrawal of the sealing member.

10. The ink refill container according to claim 9, further comprising a cap configured to be attached to the ink-outlet forming portion, wherein the cap includes a cap sealing portion that, in an attached state, is in contact with a distal end of the sealing member to achieve sealing.

11. The ink refill container according to claim 9, wherein the cover cap is formed integrally with the holder member.

12. The ink refill container according to claim 9, wherein the cover cap is to be thread-engaged with the cylindrical portion.

13. An ink refill container for refilling a printer having an ink inlet flow-path member with ink, the ink refill container comprising:

a container body portion configured to store ink; and an ink-outlet forming portion coupled to the container body portion and having a cylindrical portion forming an ink outlet, the ink-outlet forming portion including:

a valve disposed in the cylindrical portion, the valve being configured to be opened by the ink inlet flow-path member inserted in the cylindrical portion and closed by withdrawal of the ink inlet flow-path member from the cylindrical portion;

a sealing member disposed at the ink outlet, the sealing member configured and arranged to be in contact with the valve in a closed state of the valve;

a holder member configured to hold at least one of the valve and the sealing member; and a fixing portion configured to fix the holder member to the cylindrical portion, wherein the fixing portion includes a joining member joined to a holder distal end that is a distal end of the holder member of the cylindrical portion in the direction of the withdrawal, and a cylindrical portion distal end that is a distal end of the cylindrical portion in the direction of the withdrawal, the holder member includes a valve holding portion configured to hold the valve, and a sealing member holding portion configured to hold the sealing member, and the sealing member holding portion includes a holder engagement portion configured to be engaged with a sealing member engagement portion formed on an outer circumferential surface of the sealing member, and a stopper projection configured to be in contact with a distal end of the sealing member to restrict movement of the sealing member in the direction of the withdrawal.

14. The ink refill container according to claim 13, wherein joining by the joining member is selected from welding of a film member and bonding of a sheet member.

15. The ink refill container according to claim 13, further comprising a cap configured to be attached to the ink-outlet forming portion, wherein the cap includes a cap sealing portion having elasticity that, in an attached state, is in contact with a distal end of the holder member to achieve sealing.

16. An ink refill container for refilling a printer having an ink inlet flow-path member with ink, the ink refill container comprising:

a container body portion configured to store ink; and an ink-outlet forming portion coupled to the container body portion and having a cylindrical portion forming an ink outlet, the ink-outlet forming portion including:

a valve disposed in the cylindrical portion, the valve being configured to be opened by the ink inlet flow-path member inserted in the cylindrical portion and closed by withdrawal of the ink inlet flow-path member from the cylindrical portion;

a sealing member disposed at the ink outlet, the sealing member configured and arranged to be in contact with the valve in a closed state of the valve;

a holder member configured to hold at least one of the valve and the sealing member; and a fixing portion configured to fix the holder member to the cylindrical portion, wherein the holder member includes a valve holding portion configured to hold the valve, and a sealing member holding portion configured to hold the sealing member, the sealing member holding portion includes a holder engagement portion configured to engage with a sealing member engagement portion disposed on an outer circumferential surface of the sealing member, and a stopper projection configured to be in contact with a distal end of the sealing member to restrict the withdrawal of the sealing member, at least one of a distal end of the cylindrical portion and a distal end of the holder member includes a swaging portion bendable to the other side, the fixing portion is comprised of the swaging portion, and the swaging portion is bent to restrict the withdrawal of the holder member with the holder member mounted in the cylindrical portion.

17. The ink refill container according to claim 16, wherein the swaging portion is disposed at a plurality of positions along an inner circumference of the cylindrical portion.

* * * * *